United States Patent
Goldstein

(10) Patent No.: US 8,260,901 B2
(45) Date of Patent: Sep. 4, 2012

(54) METHOD AND APPARATUS FOR CONFIGURING INFORMATION FOR MULTIPLE NETWORK ACCESS PROVIDERS

(75) Inventor: David Goldstein, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 12/684,091

(22) Filed: Jan. 7, 2010

(65) Prior Publication Data

US 2010/0180017 A1 Jul. 15, 2010

Related U.S. Application Data

(60) Division of application No. 10/349,737, filed on Jan. 21, 2003, now Pat. No. 7,676,556, which is a continuation of application No. 09/235,646, filed on Jan. 22, 1999, now abandoned.

(51) Int. Cl.
G06F 15/173 (2006.01)

(52) U.S. Cl. ......... 709/223; 709/203; 709/217; 709/224

(58) Field of Classification Search .................. 709/203, 709/217, 223, 224
See application file for complete search history.

(56) References Cited

U.S. PATENT DOCUMENTS

| | | | |
|---|---|---|---|
| 5,475,819 A | 12/1995 | Miller et al. | |
| 5,726,979 A * | 3/1998 | Henderson et al. | 370/254 |
| RE36,444 E * | 12/1999 | Sanchez-Frank et al. | 715/839 |
| 6,012,088 A * | 1/2000 | Li et al. | 709/219 |
| 6,161,125 A | 12/2000 | Traversat et al. | |
| 6,230,194 B1 * | 5/2001 | Frailong et al. | 709/220 |
| 6,295,527 B1 * | 9/2001 | McCormack et al. | 1/1 |
| 6,370,141 B1 * | 4/2002 | Giordano, III et al. | 370/386 |
| 6,374,293 B1 * | 4/2002 | Dev et al. | 709/220 |
| 6,400,689 B1 * | 6/2002 | Sato et al. | 370/242 |
| 6,745,239 B1 * | 6/2004 | Hubbard | 709/220 |
| 6,970,919 B1 * | 11/2005 | Doi et al. | 709/220 |
| 7,039,875 B2 * | 5/2006 | Khalfay et al. | 715/762 |

OTHER PUBLICATIONS

Office Action mailed Jul. 31, 2001, issued in related U.S. Appl. No. 09/235,646, filed Jan. 22, 1999.
Office Action mailed Aug. 13, 2002, issued in related U.S. Appl. No. 09/235,646, filed Jan. 22, 1999.
Office Action mailed Mar. 11, 2008, issued in related U.S. Appl. No. 10/349,737, filed Jan. 21, 2003.
Notice of Allowance mailed Aug. 18, 2008, issued in related U.S. Appl. No. 10/349,737, filed Jan. 21, 2003.

* cited by examiner

*Primary Examiner* — LaShonda Jacobs

(57) ABSTRACT

A computer program product that provides a graphical user interface for configuring communication information for multiple network service providers on a computer system. The program product is operable to display a network communication scene that includes edit windows and selectable options for a user to view, enter, remove, and modify configuration information for at least one network service provider, and allows the user to enter information for establishing communication with the same network service provider using at least two different communication mediums, and from several different geographical locations.

20 Claims, 22 Drawing Sheets

METHOD AND APPARATUS FOR CONFIGURING INFORMATION FOR MULTIPLE NETWORK ACCESS PROVIDERS

CROSS REFERENCE TO RELATED APPLICATIONS

This application is a divisional of, and claims priority to, U.S. patent application Ser. No. 10/349,737, filed Jan. 21, 2003, which is a continuation of U.S. patent application Ser. No. 09/235,646, filed Jan. 22, 1999, the contents of each which is hereby incorporated by reference.

BACKGROUND

1. Field

This invention relates to the field of information networks, and more particularly, to configuring communication information for multiple network access providers on a computer system, to allow more efficient access to different service providers from the same computer system and from different geographic locations.

2. Description of the Related Art

A significant development in computer networking is the Internet, which is a sophisticated global wide area network (WAN) of computer systems. In order to send and receive messages over the Internet, an individual user's computer system must be connected to a network server computer system, commonly known as a server. Users may have their own server or they may subscribe to an Internet service provider (ISP) for access to a server. The servers are in turn connected to a backbone node which allows access to other servers, thereby forming the Internet. There are many different hardware and software technologies used to connect individual users and networks to the Internet. Known connection types, also referred to as communication mediums, include dial-up modem access, Integrated Services Data Network (ISDN), point-to-point services such as T1 or 56K circuits, switched technologies such as Frame Relay, X.25, Switched Multimegabit Data Service (SMDS), Asynchronous Transfer Mode (ATM), wireless radio communication, and traditional local area network (LAN) technologies such as Ethernet or the fiber distributed data interface (FDDI).

The term network service provider, as used in the present application, refers to ISPs as well as any other providers of communication network services that may or may not be associated with the Internet.

One of the fastest growing areas in Internet usage is the individual user using access technologies such as asynchronous dial-up modems or circuit-switched technologies such as ISDN. Many computer systems include a modem or serial ports that can be easily used to access networks via asynchronous dial-up connections. While these devices provide the hardware for physical transport of data, corresponding software routines and addressing protocols are required to pack up the data for transmission as well as determining a destination for the data in the communication network. In dial-up systems, the data packets are transmitted through a telephone system to a server and then through backbone nodes until they reach the destination server.

The Internet Protocol (IP) is a widely used method for transporting data within and between communications networks. IP combines the functions of internode linking with those of links between physical networks to provide communications paths between nodes on different networks. Each IP packet consists of a header and a payload. The IP header provides addressing and control information such as the IP version number, the amount of data in the packet, a destination address, and a source address. The packet payload contains information such as extension headers, higher-level protocol headers, and application or user-level content. Each IP packet is treated completely independently from all others.

Higher-level protocols rely on IP to perform more complex services. The two principal higher-level protocols that make use of IP are user datagram protocol (UDP) and transmission control protocol (TCP). UDP introduces a further point of delivery, known as a port. A port is associated with a particular program or application that listens for information sent to that particular location. TCP also uses ports, as well as packet numbering and tracking, to ensure delivery, or at least provide delivery error information, for all messages. TCP accounts for the majority of traffic using IP in the Internet, while UDP is more widely used for local area network file systems. The two protocols are part of a layered networking protocol referred to as TCP/IP as shown in FIG. 1. Each layer has a different network responsibility. If there are two hosts on a network, each host layer will communicate on a logical basis with its equivalent layer on the other host. For example, the IP internetwork layer on one host will communicate logically with the IP internetwork layer on the host across the Internet. The physical communication of data occurs on the physical link layer.

To transmit and receive packets, a host computer system must be connected to a server or router, which determines where to send packets from that point. Each server has a unique address associated with it that allows it to be identified from among other servers connected to the Internet. TCP/IP software running on the originating host computer system must therefore have access to the server's address as well as other protocol information. Further, an ISP typically provides services such as electronic mail (hereinafter "e-mail") and web page hosting for clients. Configuration information such as usernames, passwords, and mail box account names along with communication protocol information is therefore required. This configuration information is often set-up through a utility program provided in the operating system on the user's computer system. Although configuration information for some of the larger ISPs may be preset when a user purchases a new computer system, this information must typically be entered by the user if they choose a local or regional ISP. Further, when a user moves from one geographic location to another, the ISP's local dial-up access telephone number may change. Additionally, a user may wish to use different ISPs and different types of connections or communication mediums, such as modems, ISDN, and T1 links, from the same computer at different times and/or different locations, as well as when using different application programs.

The Internet is formed of a worldwide collection of wide area networks (WANs). For non-dedicated Internet access via an analog dial-up service, traditional data and voice networks connecting any two locations typically use a local and a long distance telephone service provider. The local access provider connects a user's premises to its nearest central office, where the call is then handed off to the long distance access provider. The same process is mirrored at the receiver's end where the long distance provider hands off the call to the local access provider. The hand-off point on the long distance network is referred to as point of presence (POP). Although a dial-up connection provides the physical transport for data, means to transport higher layer TCP/IP protocols over point-to-point communications media such as modem dial-up or ISDN is required.

One such protocol for transmitting IP packets over serial point-to-point communications links is serial line Internet protocol (SLIP), which was designed to operate over dedicated, character-oriented, asynchronous lines such as RS-232. SLIP has several deficiencies, such as each end must know the other end's IP address, a serial line cannot be shared between SLIP and another protocol, and there is no checksum added to the SLIP packets; SLIP relies on error-checking modems or on the higher network layers to detect errors. Another such protocol is point-to-point protocol (PPP) which is a serial line protocol that was developed to remedy known shortcomings of SLIP. PPP is primarily designed as a standards-based encapsulation protocol for network layer protocols such as IP across serial, point-to-point links. However, unlike SLIP, PPP was designed to support higher rates of data transfer and other known network layer protocols such as IPX, AppleTalk, DECnet, and OSI. PPP also performs error-checking via a cyclic redundancy check on each packet.

TCP/IP packets are sent back and forth using IP addresses that identify the sender and receiver of the data. Each server on the Internet has a unique address associated with it that allows it to be identified from among other servers connected to the Internet. Currently, IP addresses are written as four decimal integers separated by decimal points. Thus, a 32-bit numeric address is written as xx.xx.xx.xx, for example 128.10.2.30. To accommodate the growing number of users on the Internet, an alternate addressing system is being developed to allow a greater number of IP addresses.

Since humans tend to be more comfortable when using the host name of a server instead of its numeric address, a domain name system (DNS) has been developed. The DNS is essentially one distributed database system that provides the mapping between IP address and host names. The term "distributed" refers to the fact that no single site on the Internet knows all the mapping information. Each site in the distributed system maintains its own database and runs a name server that other systems across the Internet can query. The DNS is hierarchical with two or more levels that form a tree structure through the server nodes, with each server being responsible for its own domain or section of the name space.

A user may have access to the Internet through one or more ISPs and one or more different communication mediums. For example, ISPs that charge monthly subscription rates typically offer a free trial period to allow a user to try their service before subscribing. Additionally, a user may have dial-up modem access with one ISP and T1 access to another server. Currently, the user must manually alter the configuration information each time a different communication medium and/or different telephone access number is used. Therefore a mechanism that allows a user to store configuration information for several ISPs having different connection types and different geographical locations and to easily select one to connect to is desired.

Still further, with the growing popularity of portable microprocessor-based computers and personal communication systems, it is desirable to provide means for a user equipped with a portable device to select from among several pre-configured ISPs. If a dial-up connection is used through the telephone system, it is desirable to use a local telephone number to access an ISP instead of a long distance number for the ISP. In this manner, several locations for the same ISP can be configured with different local telephone access numbers to connect without reconfiguring ISP information or incurring long distance telephone charges.

SUMMARY

In one embodiment, the present invention provides a computer system that allows a user to communicate with zero, one, or more network service providers as desired. The computer system includes a display device, a user input device, a communication device, and a memory having a set of program instructions stored therein for configuring communication information for multiple network service providers. The program instructions are operable to display a network communication scene that includes edit windows and selectable options for a user to view, enter, remove, and modify some or all of the configuration information for the at least one network service provider and to allow the user to specify one or more different communication mediums to connect to the same network service provider.

The program instructions provide a user interface that is operable to detect when a user touches a selectable object in the network communication scene, and to display corresponding edit windows, objects, and information in response. For example, when the user touches a services tab, the program instruction display an add service button in the network communication scene. The program instructions detect when a user touches the add service button, and then display a choose service window that includes objects representing services available from the network service provider. The program instructions detect when the user touches a service to add, and then displays the network communication scene with the added service. The program instructions include an application programming interface that allows a user to customize the interface and to access configuration information.

Another feature provided by the program instructions is an interface to connections configured for the network service provider in the network communication scene.

Another feature provided by the program instructions is an interface for adding connections via the network communication scene. The program instructions display a window that allows the user to choose a connection type when the user touches a object for adding connections, along with options associated with the connection type. The choose connection type window includes objects representing connection types available to establish communication with the network service provider. The program instructions further detect when the user touches a connection type, and display the network communication scene with the added connection types.

Another feature provided by the program instructions is an interface for displaying, adding, modifying, and removing locations configured for the network service provider and adding or removing locations where the computer system is to be used.

In another embodiment, the program instructions of the present invention are provided as a computer program product for configuring communication information for multiple network service providers on a computer system.

In another embodiment, the present invention provides a method for configuring information for a network service provider using a graphical user interface on a computer system. The method includes displaying a network communication scene that includes edit windows and selectable options for a user to view, enter, remove, and modify configuration information for one or more network service providers, wherein the user may enter at least two different means for establishing communication with the same network service provider.

The present invention provides a graphical user interface for configuring communication information for multiple network service providers from multiple locations. Consequently, a mobile user with a portable computer system has ready access to configuration information for establishing communication with several different network service providers, and/or the same network service provider from several different locations. Any type of communication medium, such as dial-up modem or wireless communication, may be utilized. An application programming interface features allows configuration information to be entered with minimal user interface. The application programming interface feature also allows the user to access configuration information from external application programs and to customize the user interface by adding objects to any of the network center scenes or windows, to provide further networking capabilities.

The foregoing has outlined rather broadly the objects, features, and technical advantages of the present invention so that the detailed description of the invention that follows may be better understood.

BRIEF DESCRIPTION OF DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
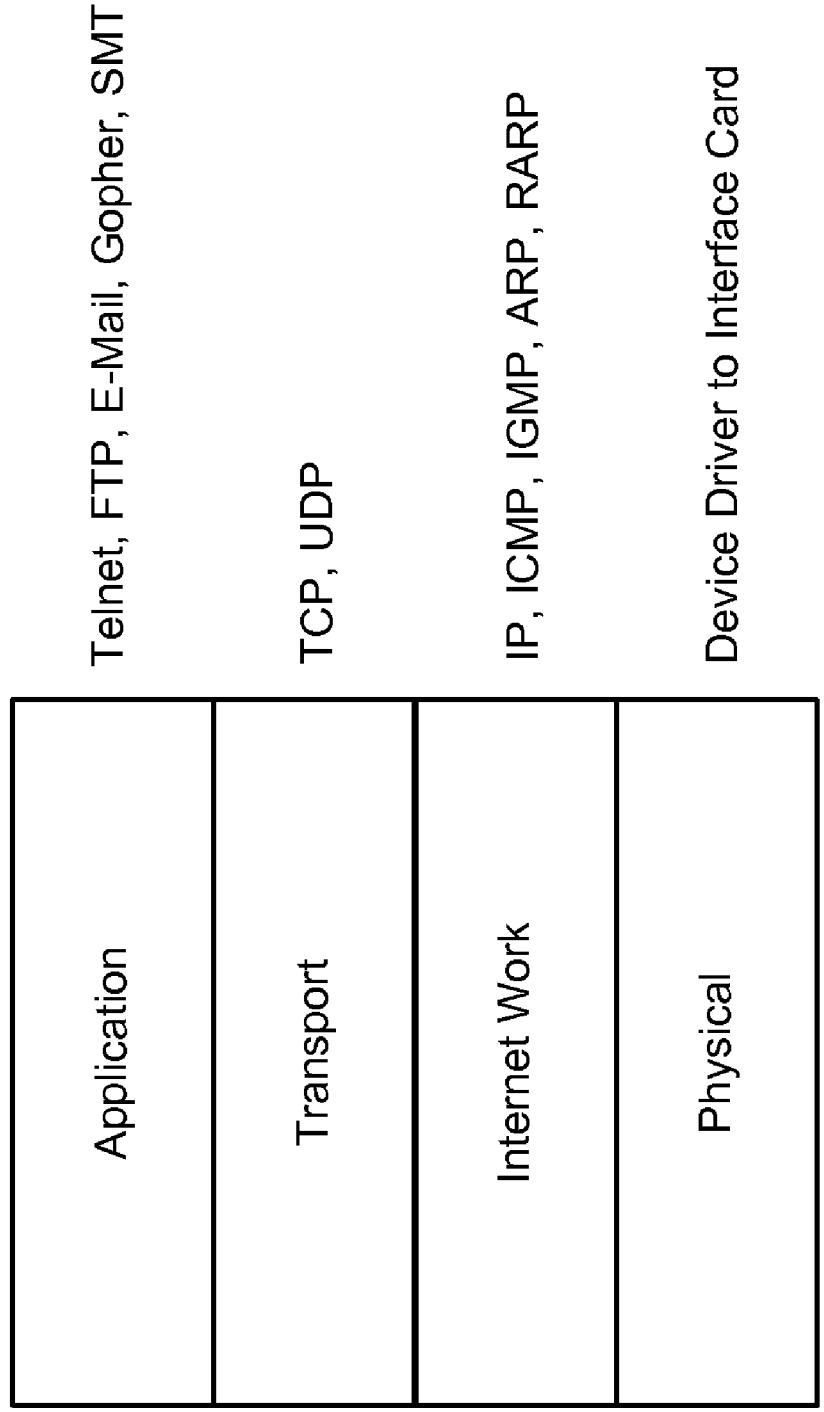
FIG. 1 is a diagram of TCP/IP layers.
Figure 2:
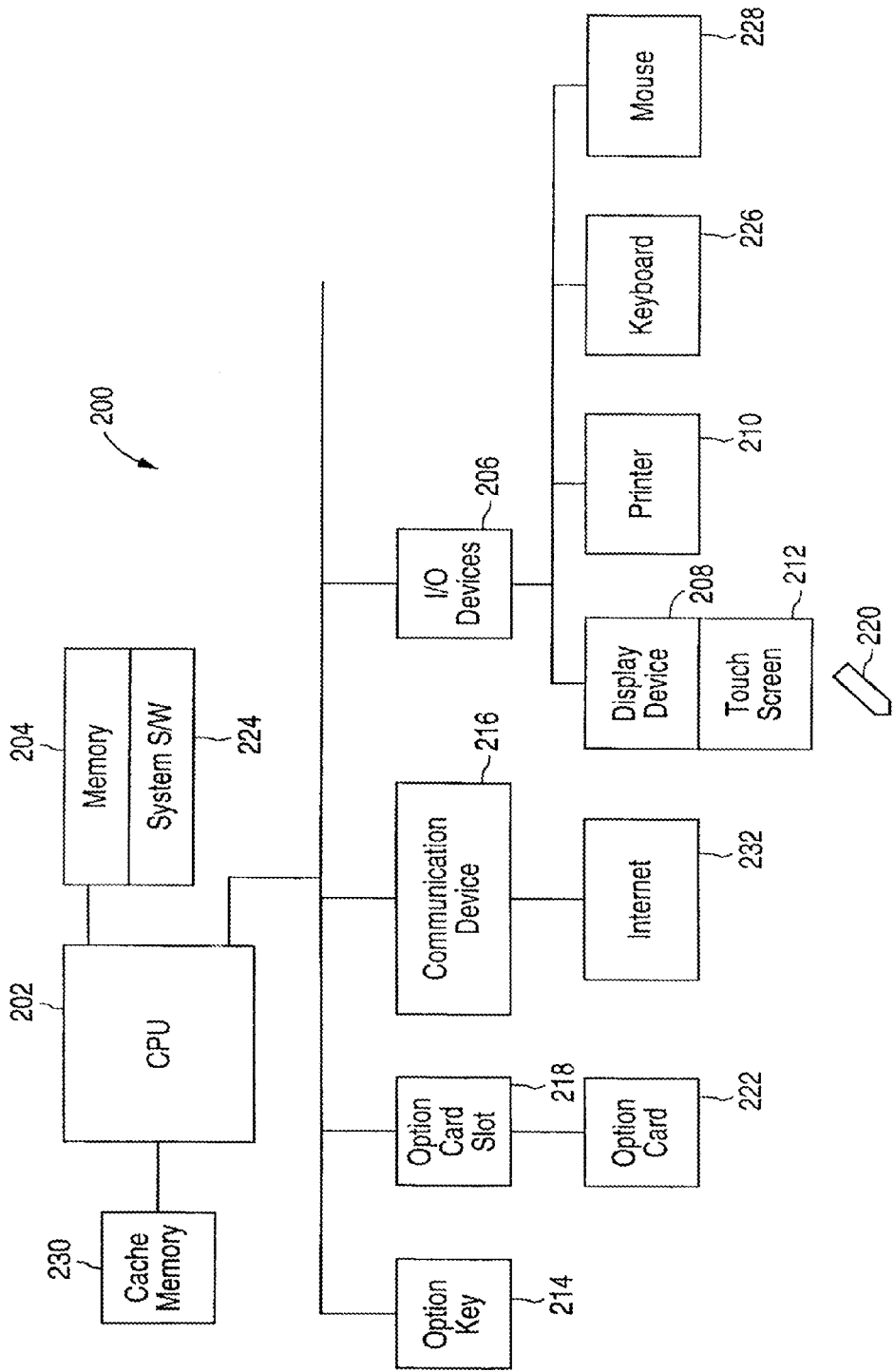
FIG. 2 is a block diagram of components included in a computer system.

Referring now to FIG. 2, a diagram of components commonly included in computer system 200 within which the present invention may be utilized is shown. Computer system 200 includes central processing unit (CPU) 202 which is coupled to memory 204, input/output (I/O) devices 206 such as display device 208, printer 210, and touch screen 212, option key 214, communication device 216 and option card slot 218. Memory 204 includes random access memory. Memory 204 also includes non-volatile memory such as read only memory or magnetic discs. CPU 202 can be constructed from one or more microprocessors and/or integrated circuits.

Display device 208 is, for example, a liquid crystal display (LCD) having 480 columns by 220 rows of pixels, each pixel being capable of displaying one of four levels of grey. Display device 208 may incorporate touch screen 212 which is a touch sensitive device that overlays display device 208 and provides signals to CPU 200 when it is touched by a touching device such as stylus 220 or by the finger of a user. The signals include signals indicating the coordinate location of display device 208 where the touch occurred.

While touch screen 212 is described herein as the position locator used with the present invention, any known position locator can be used with the present invention. Other position locators which can be used with the present invention include mouse devices, trackball devices, thumbwheels, tablets, scanline sensitive stili, joysticks and radio-frequency digitizing devices. The term position locator refers to any device which can be used to indicate a position on the display screen.

Often the position indicated by a position locator corresponds to the location of a cursor which is displayed on the display device 208. However, with touch screen 212, the position corresponds to the location that is touched. Most position locators are operable in an actuated state and in a deactuated state. For example, mouse devices often include a mouse button, the pressing of which places the mouse device in an actuated state and the releasing of which places the mouse device in a deactuated state. Touch screen 212 is in an actuated state while touched and in a deactuated state while not touched.

Actuating a position locator, i.e., placing the position locator in an actuated state, while the position locator indicates the position at which an object is displayed in display device 208 is herein called touching the object. The touching of an object, which can be effected with any known position locating device, should not be confused with the physical touching of touch screen 212 which actuates touch screen 212 and indicates a point on display device 208. For example, an object can be touched using a mouse device as a position locator by manipulating the mouse to indicate a position within display device 208 occupied by the object and actuating the mouse device.

The terms drag and drop are used herein as they are generally understood in the art. An object is dragged across display device 208 by (i) using the position locator to indicate a position at which the object is displayed; (ii) actuating the position locator; (iii) changing the position indicated by the position locator to a second position while maintaining the position locator in an actuated state; and (iv) deactuating the position locator to thereby drop the object at the second position. With respect to dragging and dropping objects across display device 208 while using touch screen 212 as a position locator, an object is dragged and dropped by (i) actuating touch screen 212 with, for example, stylus 220 at a position at which the object is displayed; (ii) moving stylus 220 to a second position on display device 208 while keeping stylus 220 in physical contact with display device 208; and (iii) removing stylus 220 from physical contact with display device 208 to thereby "drop" the object at the second position. A user can use, in the place of stylus 220, any similar physical object, e.g., a finger of the user, to drag a graphical object across touch screen 212.

Option key 214 provides signals to CPU 202 indicating when option key 214 is activated. Generally, option key 214 is activated in combination with activation of a location on display device 208. Option card slot 218 is configured to receive an option card such as memory card 222.

Memory 204 stores Magic Cap™ system software 224 which controls the operation of computer system 200. System software 224 includes groups of instructions which are organized as objects. During operation of system 200, CPU 202 retrieves the objects from memory 204 and executes the objects to perform tasks. Computer system software 224 includes objects which provide a graphical user interface to display device 208. The graphical user interface includes a navigation system which allows a user to navigate within computer system software 224 using metaphors of physical objects. The graphical user interface allows a user to access and control system 200 via visual presentations that are provided by display device 208.

Those skilled in the art will recognize that computer system 200 encompasses all types of computer systems including personal computers, midrange computers, mainframes, and handheld personal communicators. Note that many additions, modifications, and deletions can be made to this computer system 200 when used with the present invention. Examples of this are input keyboard 226, cache memory 230, and peripheral devices such as mouse 228 and printer 210. Computer system 200 may be one of many computer systems connected to a local area network (LAN), a wide area network (WAN), or a global information network such as the Internet 232.

Communication device 216 allows computer system 200 to send and receive data to and from any network computer system 200 may be connected to. This network may be a local area network (LAN), a wide area network (WAN), and/or a global information network such as the Internet. Suitable methods of connecting to the Internet 232 include known analog and/or digital networking mechanisms. Many different network protocols can be used to implement a network. The protocols are implemented in specialized software programs that allow computers to communicate across a network. TCP/IP used to communicate across the Internet 232, is an example of a suitable network protocol.

While the present invention is described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as other known media storage and distribution systems.

Figure 3:
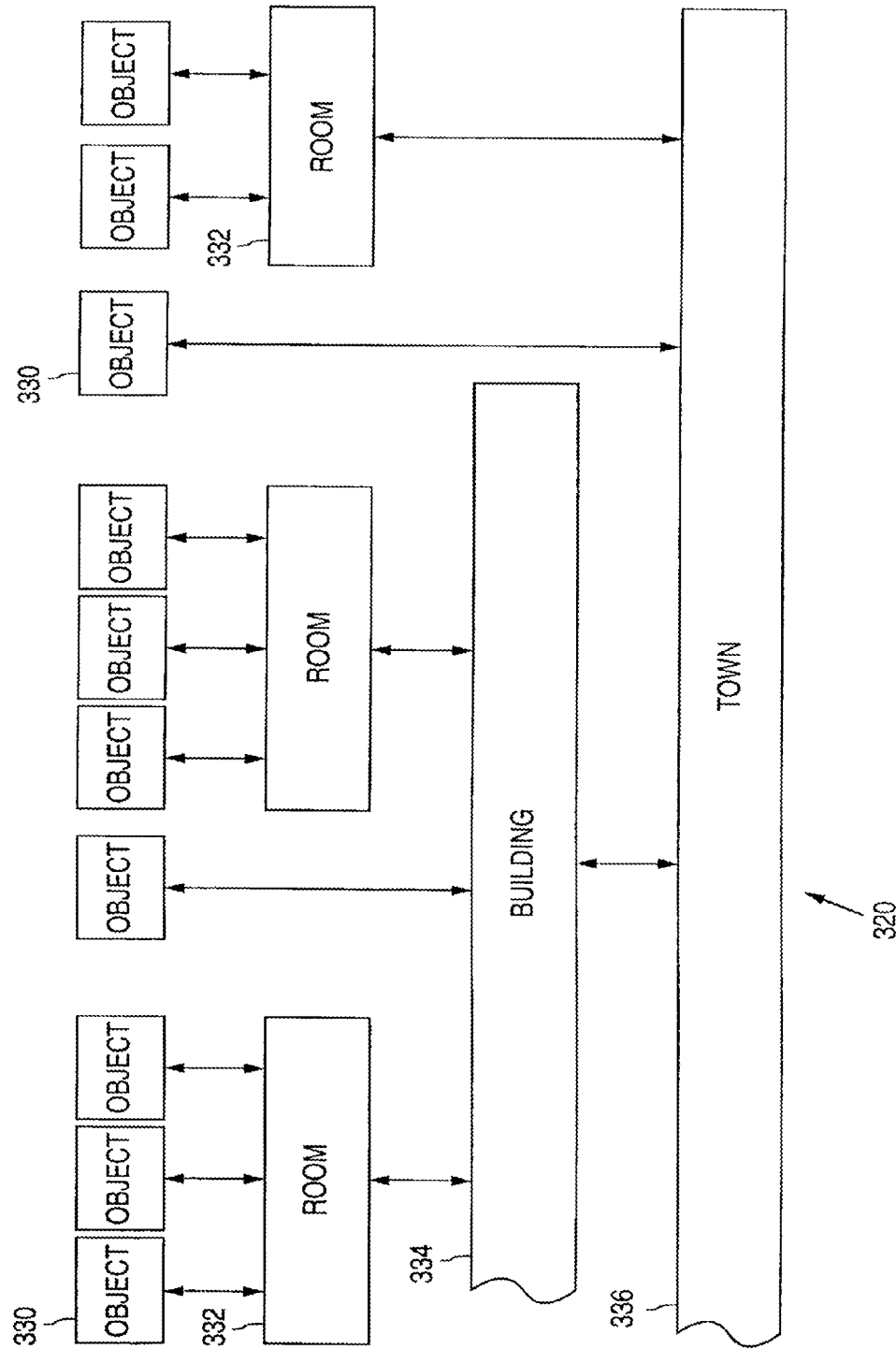
FIG. 3 is a block diagram of a software system with which the present invention may be utilized.

Referring to FIG. 3, computer system software 224 includes navigation system 320. Navigation system 320 allows a user to access the objects of computer system software 224 (i.e., to navigate within computer system software 224). Navigation system 320 includes four metaphoric levels of navigation, a first level, individual object level 330, a second level, room level 332, a third level, building level 334 and a fourth level, town level 336. A user moves between and among these levels to navigate within computer system software 224. Moving between and among these levels provides the user with a context switching navigation environment.

Individual object level 330 is the lowest navigation level and is a function specific level. Individual object level 330 includes metaphors of familiar objects which correspond to the specific functions.

Room level 332 is the navigation level which provides a user with options of choosing function specific objects which are included as part of the room. Room level 332 provides access to various function specific objects using a room metaphor with each function specific object being represented as a physical metaphor for the object. Most rooms within navigation system 320 are designated for a particular activity or group of activities. Room level 332 provides a representation of a commonly understood volume of physical space.

Building level 334 is the navigation level which provides a user with options of choosing various room objects which are part of the building. Building level 334 connects the various room level objects via a hallway metaphor having doorway metaphors to represent access to the various rooms. All of the objects which are included within computer system software 224 are included within a building having a metaphor for a home. All of these objects are accessed via the home building hallway and rooms that are connected to the home building hallway. Building level 334 provides a representation of a commonly understood way of traveling between locations.

Town level 336 is the navigation level which provides a user with options for choosing various building objects which are part of the town. Town level 336 connects the various building objects via a street metaphor. The building objects represent services and information which are remote to computer system 200; these services are accessible through communication device 216. Town level 336 provides a representation of a commonly understood way of traveling between locations.

A user navigates among the objects of computer system software 224 of computer system 200 by stepping into lower navigation levels and stepping back to higher navigation levels. For example, a user steps back from room level 332 to get to street level 334 or a user steps into object level 330 by stepping into an object that is displayed in room level 332.

Levels 330-336 are interconnected in descending object levels, i.e., a number of individual objects are coupled to a single room object, a number of room objects are coupled to a single town object. Building objects may include only a single room, in which case room object 332 is coupled directly to street object 336. Additionally, individual objects 330 may be directly accessed from either a building object or a town object, in which case an individual object 332 is coupled directly to the building object 334 or the town object 336 via which the individual object is accessed. Additionally, hallway level 334 may be coupled to a room level object which itself functions as a hallway-like object accessing other room level objects. With this type of room object, the room level object provides a way of traveling between locations in the room.

Navigation system 320 is based on a conceptual model that includes metaphoric representations of a physical environment and physical objects within the physical environment to provide an intuitive means for a user to navigate within computer system software 224. In this model, visual presentations of physical locations (i.e., scenes) are displayed on display device 208 to provide a metaphor to a user as if the user were navigating or moving within a physical environment. As a user navigates within computer system software 224, different scenes are presented on display device 208 which include physical metaphors to indicate a present location within the computer system software 224 to a user.

Figure 4:
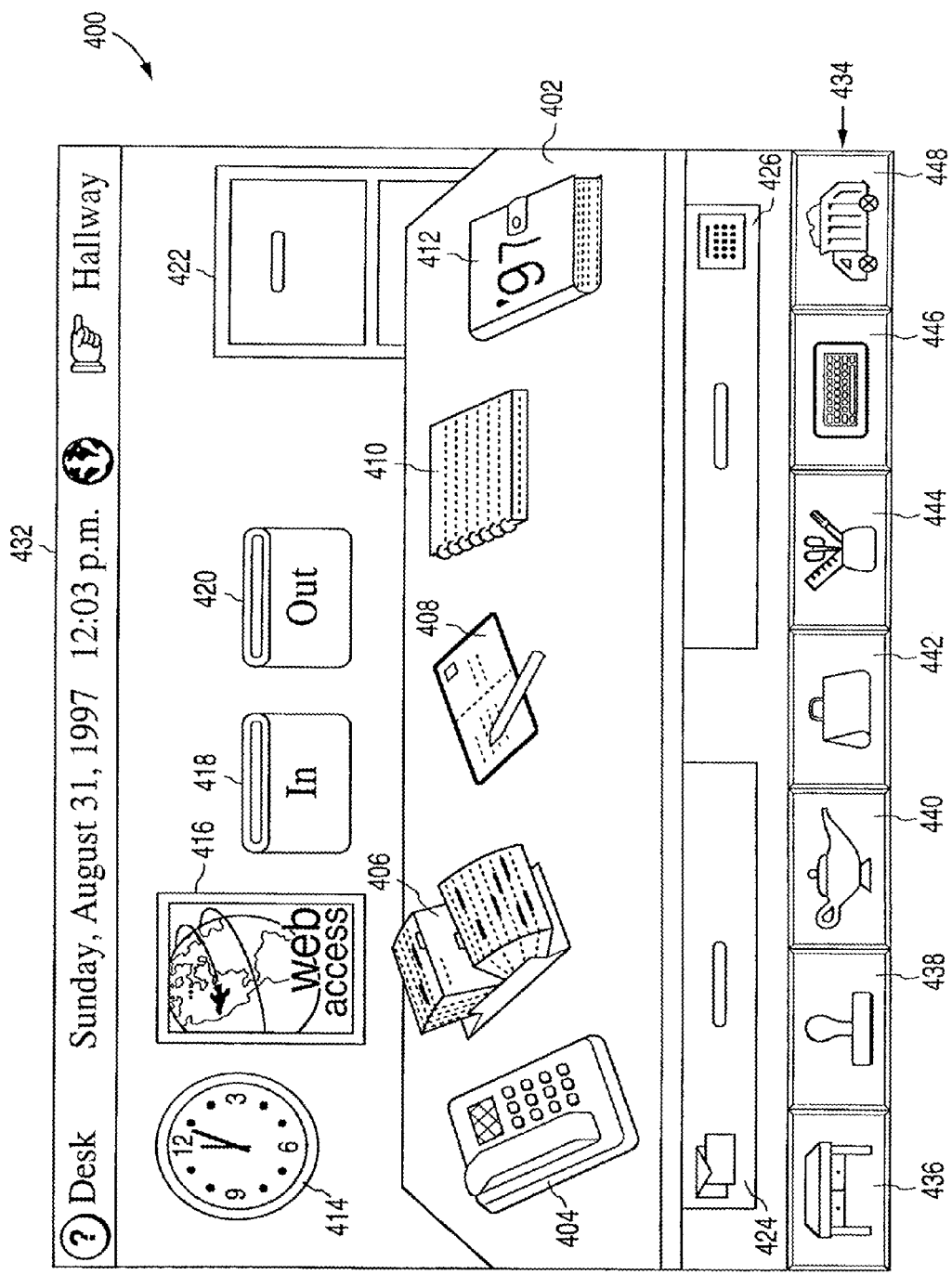
FIG. 4 is a plan view of a desk top scene from which the present invention may be accessed.

Referring to FIG. 4, desk room scene 400 is shown which is the default navigation location of computer navigation system 320, i.e., when computer system 200 is first powered on, desk room scene 400 is the scene which is presented on display device 208.

Desk room scene 400 presents a representation of a room containing desktop 402. On desktop 402 are physical metaphors of different objects which are accessible from desk room scene 400. For example, on desktop 402 are physical representations for telephone 404, name card rack 406, postcard 408, notebook 410, and datebook 412. Desk room scene 400 also includes physical representations for other objects which are accessible from desk room scene 400 such as clock 414, web access icon 416, in box 418, out box 420, and file cabinet 422. Each of these physical representations represent the function that the corresponding object performs. E.g., when telephone object 404 is actuated, a telephone function is accessed. Web access icon 416 provides an interface for the user to connect to access a application program for interfacing with a network, such as a browser program for interfacing with the well-known world wide web via the Internet. Desk room scene 400 also includes stationery drawer 424 and overflow drawer 426 which are presented as part of the desk metaphor. When actuated, drawers 424, 426 provide access to more specialized objects.

In addition to the desk room scene, every screen presentation, including desk room screen 400, includes title bar 432 displayed across the top of display device 208 and button strip 434 displayed across the bottom of display device 208. Title bar 432 and button strip 434 are displayed at each level of navigation system 320.

Title bar 432 provides user information as well as navigation control. On the left side of title bar 432 is a scene description request icon "?" as well as a title of the present location within navigation system, e.g., "desk". Activating the scene description request icon causes CPU 202 to provide information about the present scene onto display device 208. On the right side of title bar 432 is a step back description indicating a scene to where a user steps back from the present location, e.g., "hallway"; by actuating this description, a user steps back to the described scene. Accordingly, the step back description on title bar 432 provides step back control which is external to the particular scene, i.e., the area of display device 208 where the metaphor is realized.

Button strip 434 provides access to commonly used functions of computer system 200. Touching a button activates the touched button. Button strip 434 includes desk button 436, stamper button 438, magic lamp button 440, tote bag button 442, tool holder button 444, keyboard button 446 and trash button 448. Desk button 436 is activated from any navigation location to return to desk room scene 400. Stamper button 438 is activated to present a catalog of stamps in a window on display device 208. Magic lamp button 440 is activated to access general purpose commands; the actual command options may differ depending upon the scene that is presented when magic lamp button 440 is actuated. Tote bag button 442 is activated to store items and move items from place to place. Tool holder button 444 is activated to access writing and drawing tools. Trash button 448 is activated to manipulate, on display device 208, an item that is to be removed from computer system 200.

Figure 5A:
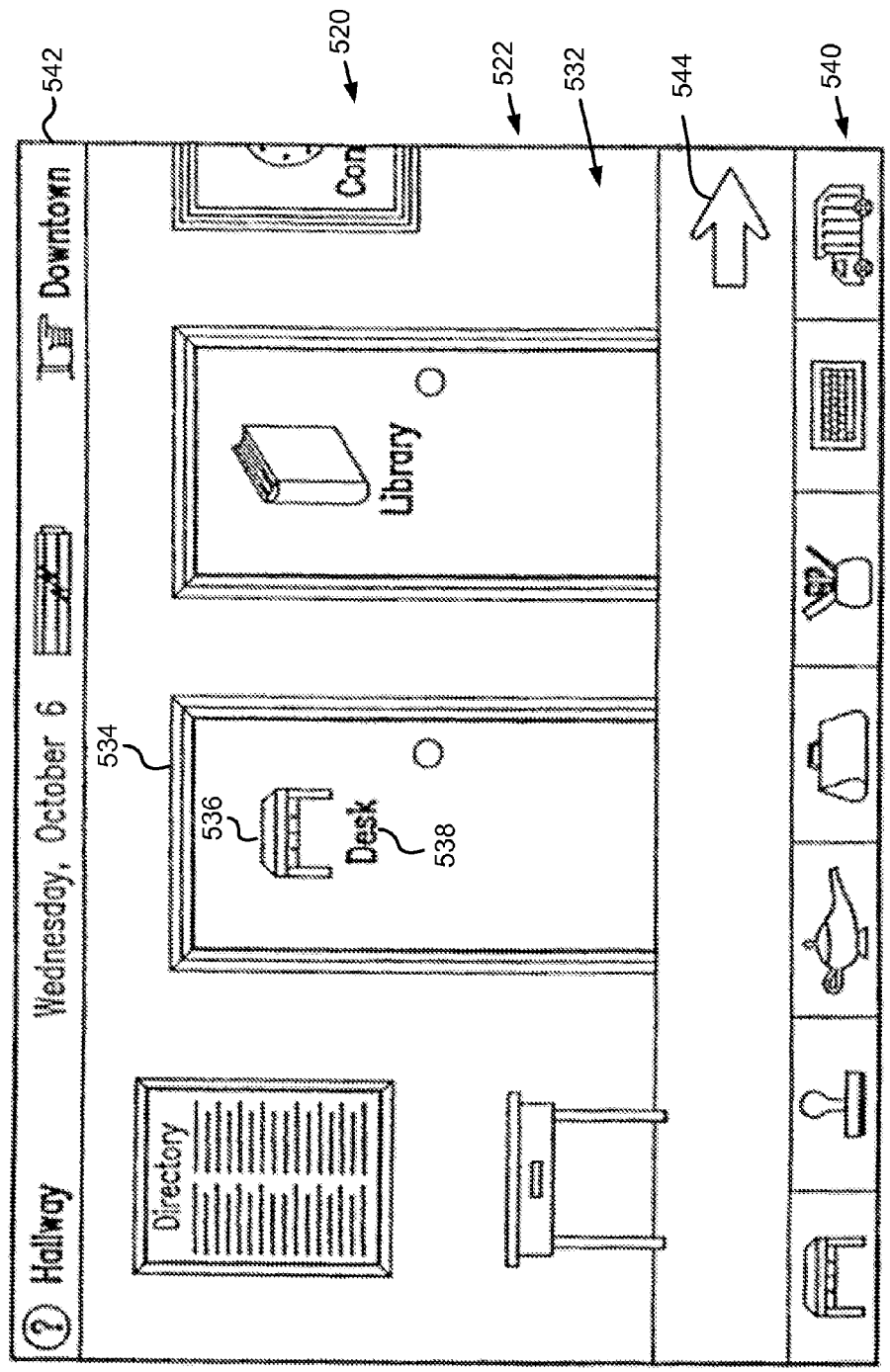
FIGS. 5A-5B are various hallway scene presentations of a graphical user interface in accordance with the present invention.
Figure 5B:
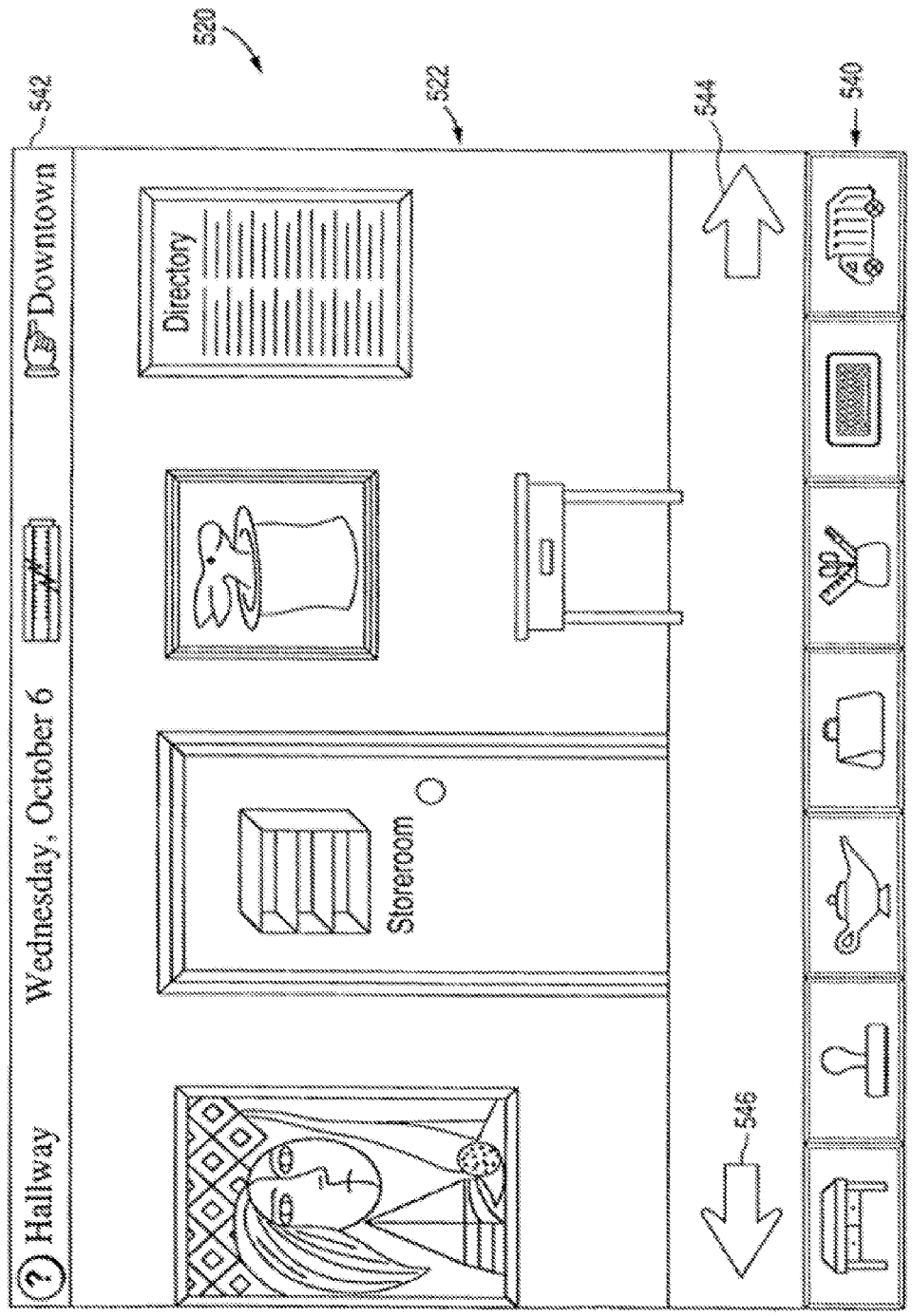

Referring to FIGS. 5A-5B, hallway scene presentation 520 includes hallway scene 522. Hallway scene 522 is the scene to which a user steps back from desk room scene 400. Hallway scene 522 represents a hallway navigation level object. A hallway level object is accessible from room objects 532 by stepping back from the room level object. Additionally, a plurality of room level objects may be accessed from hallway scene 522. Each room level object is accessed via an entrance which is represented with a metaphor of a doorway. For example, desk room scene 400 is accessed via desk doorway 534, which sets forth a graphical representation of a desk 536 along with the textual representation of a desk 538, i.e., the word "desk".

As with desk room scene 400, hallway scene presentation 520 includes button strip 540 and title bar 542. Title bar 542 shows in text that hallway scene 522 is the present navigation level and also shows in text that downtown is the navigation level to which a user can step back. Hallway scene 522 includes right arrow 544 and left arrow 546. Arrows 544 and 546 allow a user to navigate throughout hallway scene 522 by simulating movement along the hallway. More specifically, when right arrow 544 is actuated, a user moves down hallway scene 522 to the right. When left arrow 546 is actuated, a user moves down hallway scene 522 to the left. When a user reaches one end of the hallway scene 522, then only one arrow is displayed and only movement in the direction indicated by the single arrow is permitted.

Figure 6A:
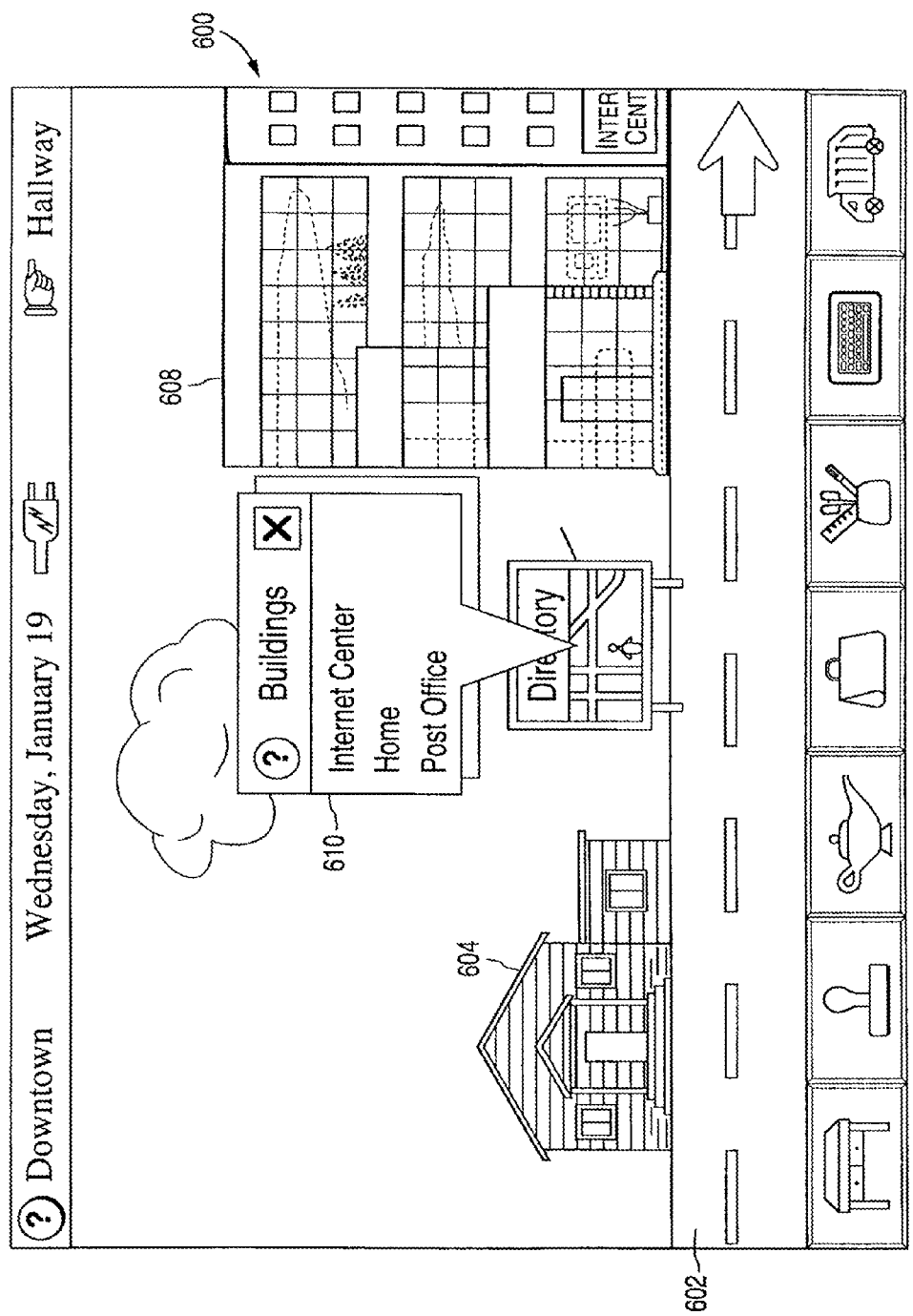
FIGS. 6A-6B are plan views of various downtown street scene presentations of a graphical user interface in accordance with the present invention.
Figure 6B:
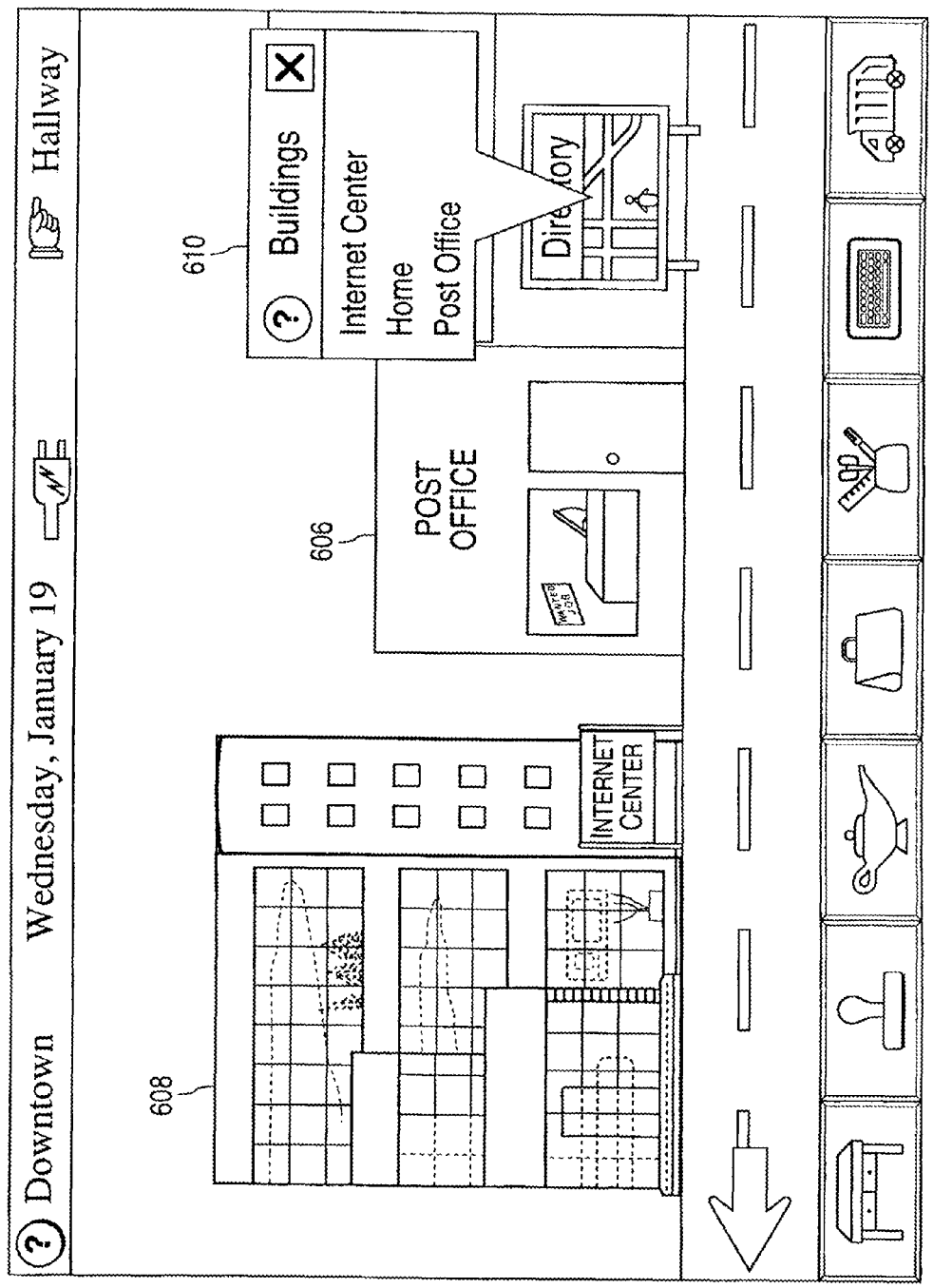

FIGS. 6A-6B show downtown scene 600 which is the scene to which a user steps back from hallway scene 522. Downtown scene 600 represents the town navigation level which provides a user with access to services and information which are remote to computer system 100. Downtown scene 600 includes a plurality of buildings which are interconnected via street 602. Each building represents a service which is accessible via computer system 100. The buildings include house 604, which is a metaphoric representation for a default home location, as well as post office 606, and Internet center 608. The buildings function as entrances to respective services, as the doorways do in hallway scene 522. Additional buildings may be added to provide an interface to any other services that are included in the system. One or more directories 610 are placed at intervals along the street to provide the user with a list of services available from the town navigation level. The user may be brought directly to one of the buildings by selecting it from the directory.

Figure 7:
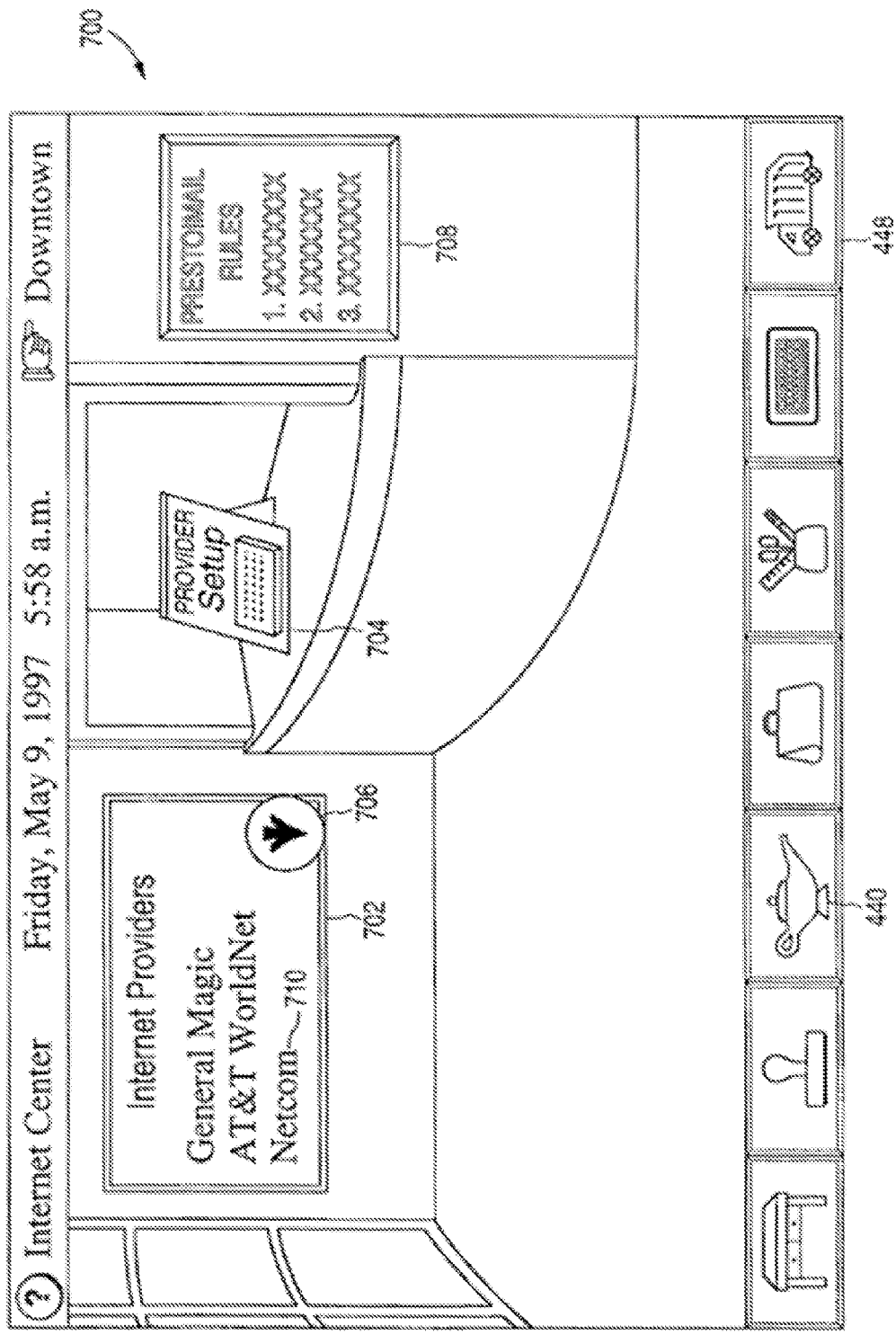
FIG. 7 is a plan view of an Internet center scene in accordance with the present invention.

Referring to FIG. 7, when Internet center 608 is selected from directory 610 or by actuating Internet center 608, then Internet center scene 700 is displayed on display device 208. The Internet center scene 700 includes selectable objects, such Internet providers sign 702 for changing configuration information for an ISP, provider setup sign 704 for configuring an ISP, and mail rules sign 708 for customizing electronic mail options. Internet center scene 700 may include additional objects that allow a user to enter and modify other information regarding ISPs, or to interact with a particular application program, as necessary. The present invention also includes an application programming interface (API) that allows objects to be added and information to be entered in any Interet center 608 scene using an application program external to the present invention. Application programs using the API can select information to use, including none, some, or all the information associated with one or more of the ISPs. Additionally, an external application program may define their own user interface for entering, modifying, and viewing configuration information. This is especially useful when a service requires configuration information that is not required for other ISPs.

An external application program may also retrieve configuration information associated with Internet center 608. Further, an external application program may present a symbol or other selectable device that provides a shortcut to various scenes associated with the Internet center 608.

Figure 8A:
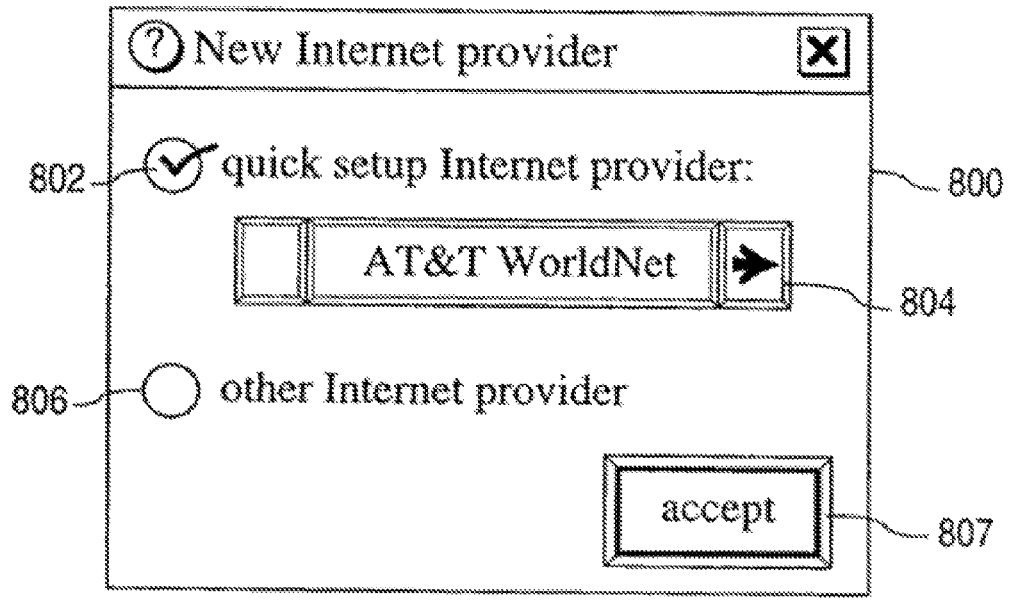
FIGS. 8A-8T are plan views of various Internet center scenes and windows showing information and options for configuring a network service provider in accordance with the present invention.

Configuration information for commonly used, nationwide ISPs may come preconfigured in system software 224. A use may also enter configuration information for an ISP. To add a new ISP, a user touches provider setup object 704 to open a new ISP window 800 as shown in FIG. 8A. New ISP window 800 allows a user to select a preconfigured ISP by touching quick setup option 802. A complete list of ISPs that are already configured is displayed by touching arrow 804. A user may enter information for an ISP that is not listed in quick setup option 802 by touching other Internet provider option 806. The user touches accept button 807 to begin entering configuration information for the selected ISP.

Figure 8B:
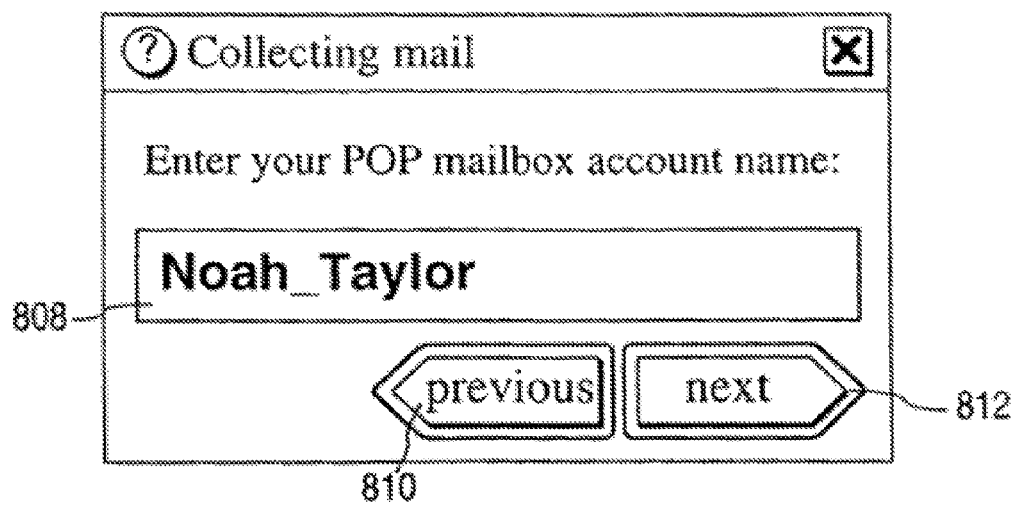

When a preconfigured ISP is selected using quick setup option 802, a series of edit windows are presented on display device 208. FIG. 8B shows one such edit window, in which the name of the POP mailbox, also referred to as a username, appears in edit window 808. The name of the POP mailbox may be modified as known, whereby the user touches the inner portion of edit window 808 and a movable cursor appears to allow the user to change any or all of the characters. Previous button 810 and next button 812 allow the user to go backward to the preceding window or forward to the succeeding window. Previous button 810 and next button 812 are included in displays of edit windows that are intermediate other edit windows. Previous button 810 is shown on the last of the series of edit windows.

Figure 8C:
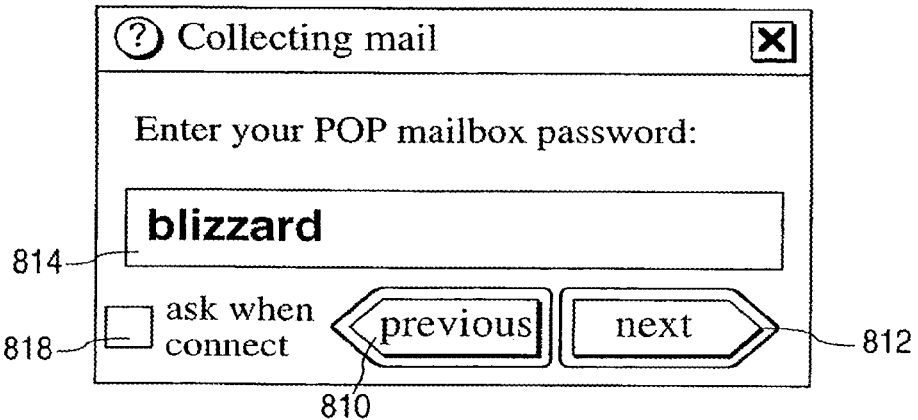
Figure 8D:
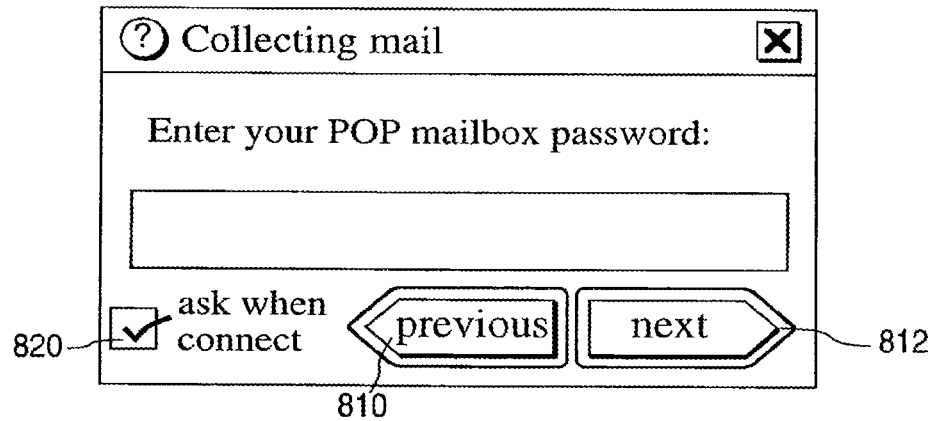

FIG. 8C shows edit window 814 that displays a user's POP mailbox password in frame 816. A user may edit the password or choose not to store a mailbox password in computer system 200 by touching ask when connect option 818. When the ask when connect option 818 is selected, a symbol, such as check mark 820 as shown in FIG. 8D, appears and computer system 200 will prompt the user for the password when connecting to the ISP's electronic mail system.

Figure 8E:
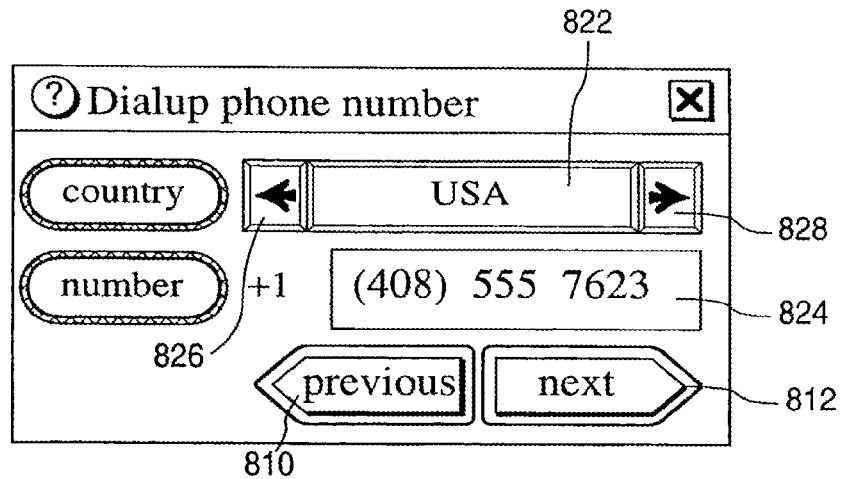

FIG. 8E shows choice box 822 and edit window 824 for displaying and modifying PPP dial-up access country and access phone numbers that computer system 200 will use to connect to this ISP. Touching left arrow 826 or right arrow 827, cycles forward or backwards one at a time through a list countries whose dialing conventions are known to computer system 200. Touching choice box 822 in the center portion between arrows 826 and 827 presents the user with an alphabetized list of countries whose dialing conventions are known to computer system 200. When there are many choices, the entire list may not fit in the display area. Further, it may be cumbersome for the user to scroll through the choices one at a time using arrows 826 and 827. In this situation, a partial list of countries is displayed and a scroll bar is included to allow the user to page through the list more rapidly. Touching country button 828 causes the same result as touching the center portion of choice box 822. Number button 829 selects edit window 824 so that the user may enter area code and telephone number information in edit window 824. The same result is achieved when the user touches edit window 824 directly.

Figure 8F:
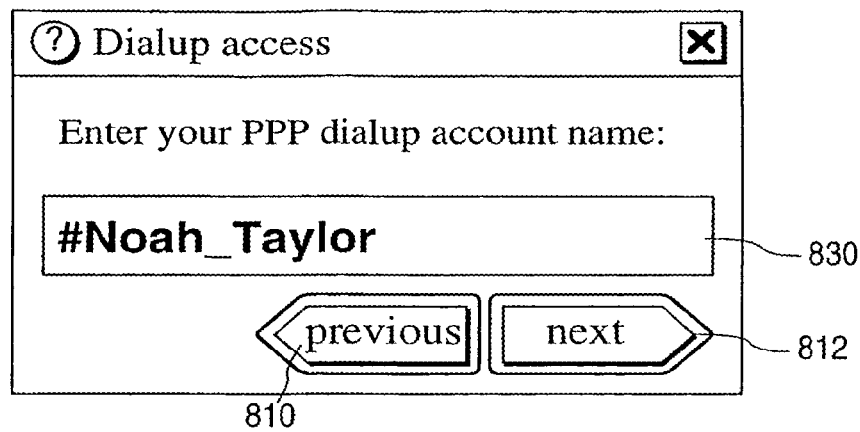
Figure 8G:
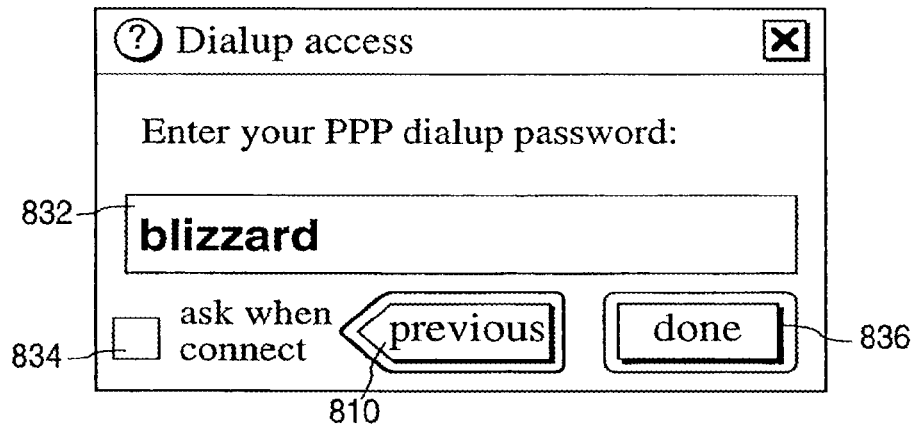
Figure 8H:
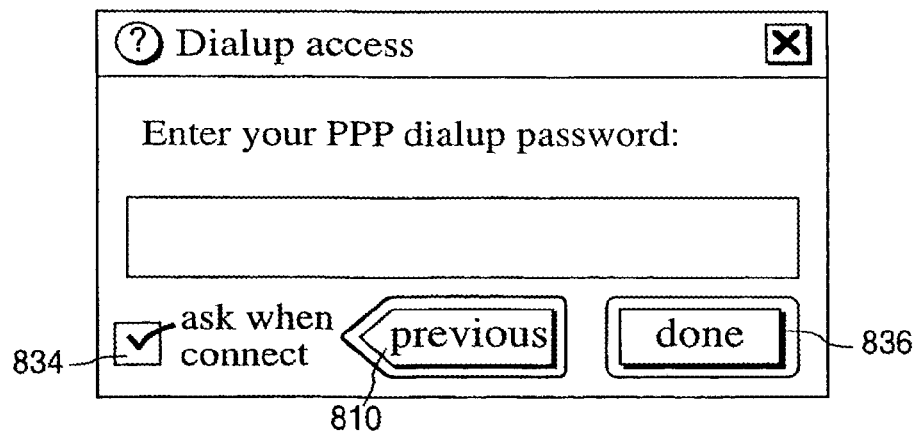

Edit window 830 in FIG. 8F allows the user to modify the PPP dial-up access account name, while the next edit window 832 in FIG. 8G allows the user to modify the dial-up password. A user may edit the password or choose not to store the PPP dial-up password in computer system 200 by touching ask when connect option 834. When the ask when connect option 834 is selected, a symbol, such as a check mark as shown in FIG. 8H appears and computer system 200 will prompt the user for the PPP dial-up password when connecting to the ISP's server. FIGS. 8G and 8H also show a done button 836 that a user selects when finished modifying or viewing edit window information to return to Internet center scene 700.

Referring back to FIG. 8A, when a user touches other Internet provider option 806, a series of edit windows, such as shown in FIGS. 8I-8T is presented to the user that allow the user to enter configuration information for a new ISP. Note that some of the edit windows, namely edit windows in FIGS. 8K-8M and 8Q-8T, are the same whether quick setup option 802 or other Internet provider option 806 is chosen. The description provided hereinabove for FIGS. 8B-8D and 8G-8H applies to FIGS. 8K-8M and 8Q-8T, respectively. Additionally, previous button 810 and next button 812 function in the same manner in FIGS. 8I-8T as described hereinabove for FIGS. 8B-8H.

Figure 8I:
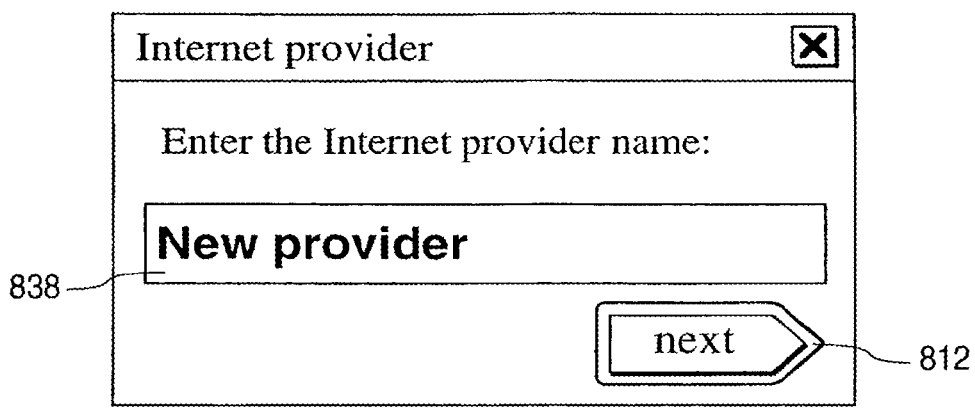
Figure 8J:
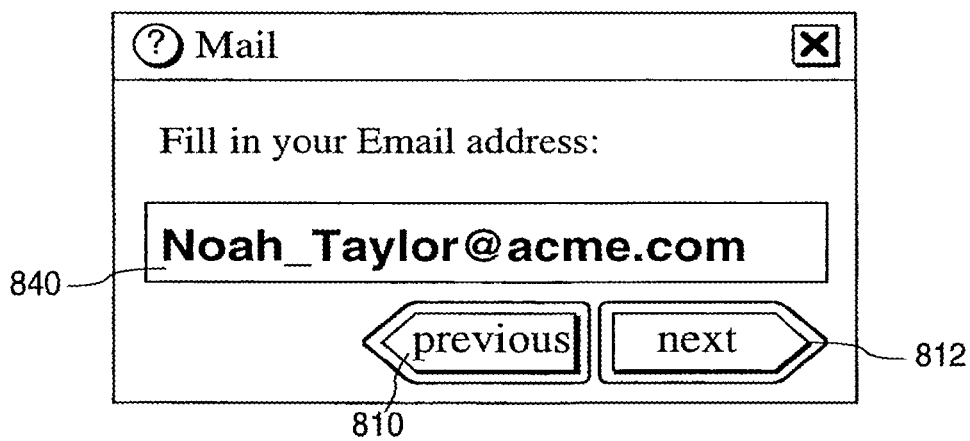
Figure 8K:
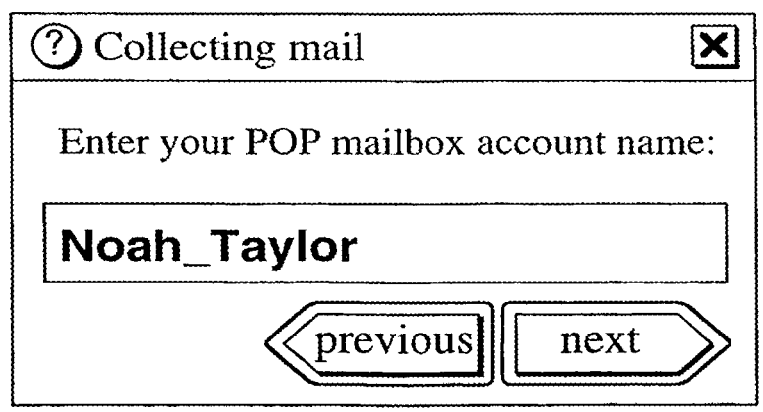
Figure 8L:
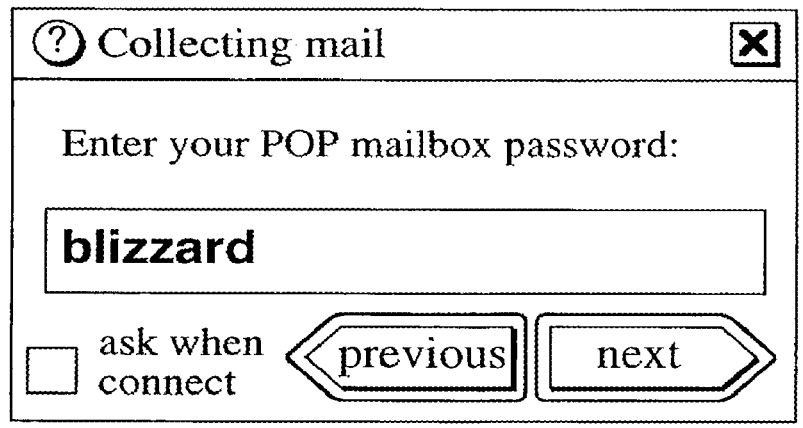
Figure 8M:
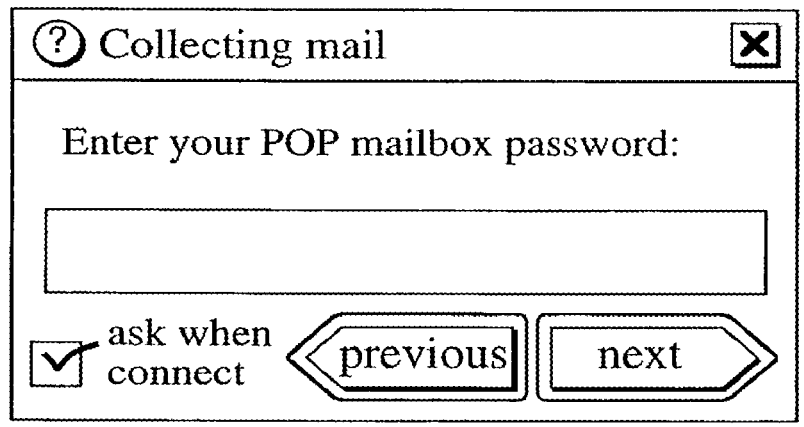
Figure 8N:
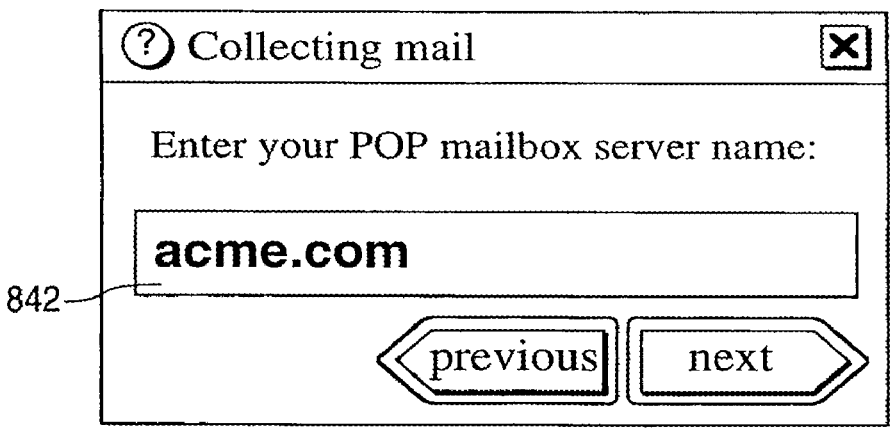
Figure 8O:
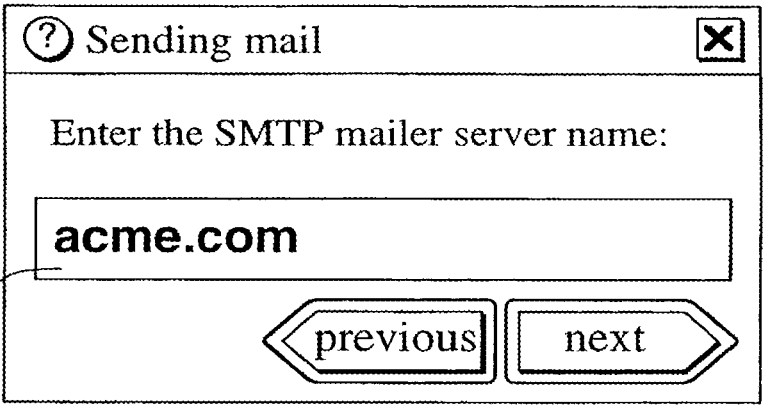
Figure 8P:
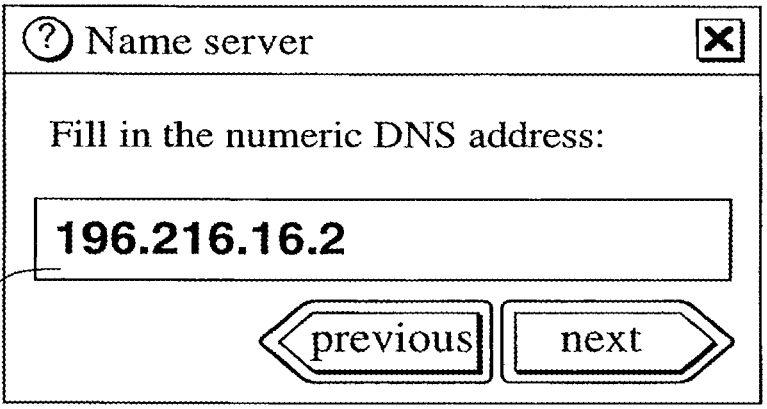
Figure 8Q:
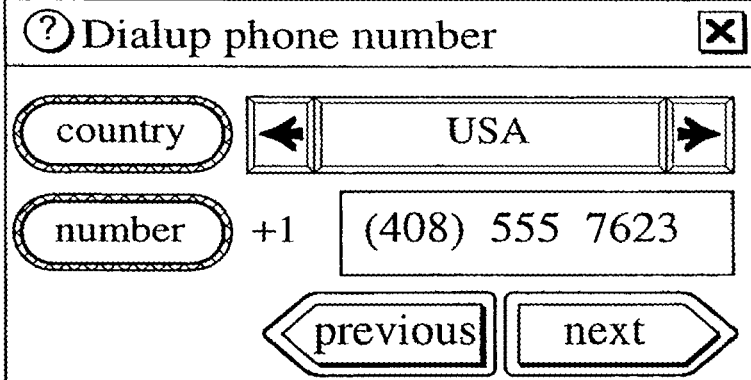
Figure 8R:
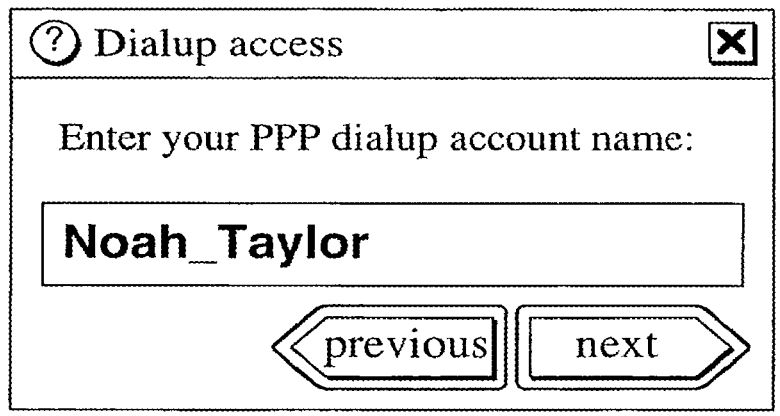
Figure 8S:
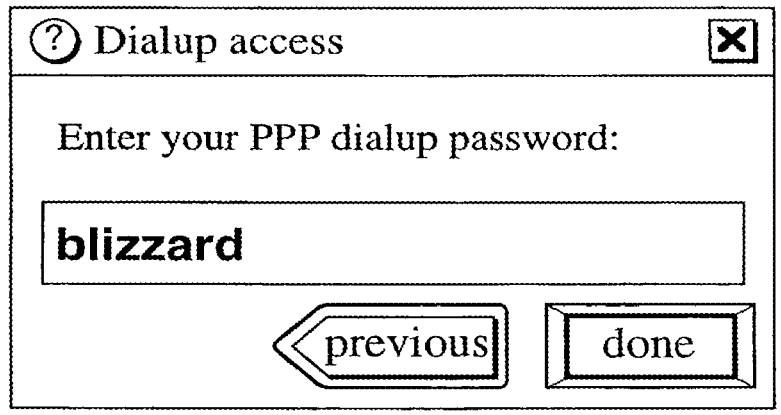
Figure 8T:
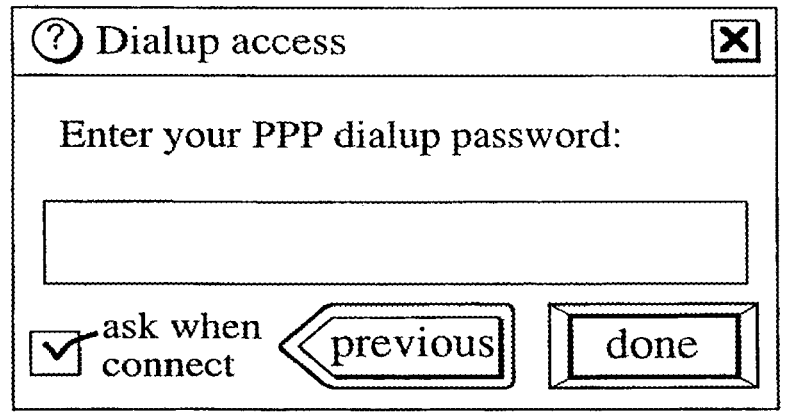

The edit windows shown in FIGS. 8L-8J and 8N-8P are unique to the other Internet provider option 806. FIG. 8I shows edit window 838 that allows a user to enter the ISP's name. The name entered in edit window 838 will appear in the list of preconfigured ISPs, such as Internet providers sign 702 in FIG. 7 and when the user selects arrow 804 in FIG. 8A.

When a user subscribes to an ISP, the ISP typically provides the user with an e-mail address, a POP mailbox server name, a simple mail transfer protocol (SMTP) mailer server name, and the DNS address for the ISP's server. This information is entered in edit windows 840, 842, 844, and 846, respectively, as shown, for example, in FIGS. 8J and 8N-8P.

Referring back to FIG. 7, a user may edit configuration information for an ISP by touching the ISP on Internet providers sign 702. A complete list of ISPs for which configuration information has been entered is displayed by touching arrow 706. When a user touches an ISP on Internet providers sign 702, an interface for viewing, entering, and modifying configuration information for the selected ISP is presented on display device 208.

For example, a set of interface displays as shown in FIGS. 9A-9I may be available for presentation on display device 208 when a user touches the ISP labeled Netcom 710 in FIG. 7. Utilizing netcom scene 900 in FIG. 9A, a user may select different types of information to view and/or modify by touching services tab 902, connections tab 904, or locations tab 906. In this example, Netcom scene 900 also includes add service button 908, rename button 910, remove button 912 and look up button 914. Add service button 908 changes depending on the view selected, while rename button 910, remove button 912 and look up button 914 remain the same for each of the three views accessed by services tab 902, connections tab 904, and locations tab 906.

In this example, touching rename button 910 causes an edit window (not shown) to be presented that allows the user to change the name of the ISP as it is to be shown on displays such as Internet provider sign 702. An ISP may be removed by touching remove button 912. When remove button 912 is touched, a confirmation window (not shown) may be presented to the user to allow the user to confirm removal of the ISP from the list of preconfigured ISPs. When look up button 914 is touched, the ISP's name card (not shown), if one exists, is presented on display device 208. A name card exists for each preconfigured ISP and a name/address card is created when an ISP is added.

Further in this example, when services tab 902 is touched, netcom scene 900 is presented on display device 208. When a user touches any of the service items listed, such as POP mailbox 916, SMTP mailer 918, or name server 920, an edit window (not shown) appears that allows the user to modify corresponding information. When add service button 908 is selected, choose a service window 922 as shown in FIG. 9B is presented on display device 208. When a service in window 922 is touched, the appropriate information may be entered next to the corresponding service, such as POP mailbox 916, SMTP mailer 918, or name server 920, in netcom scene 900.

Figure 9A:
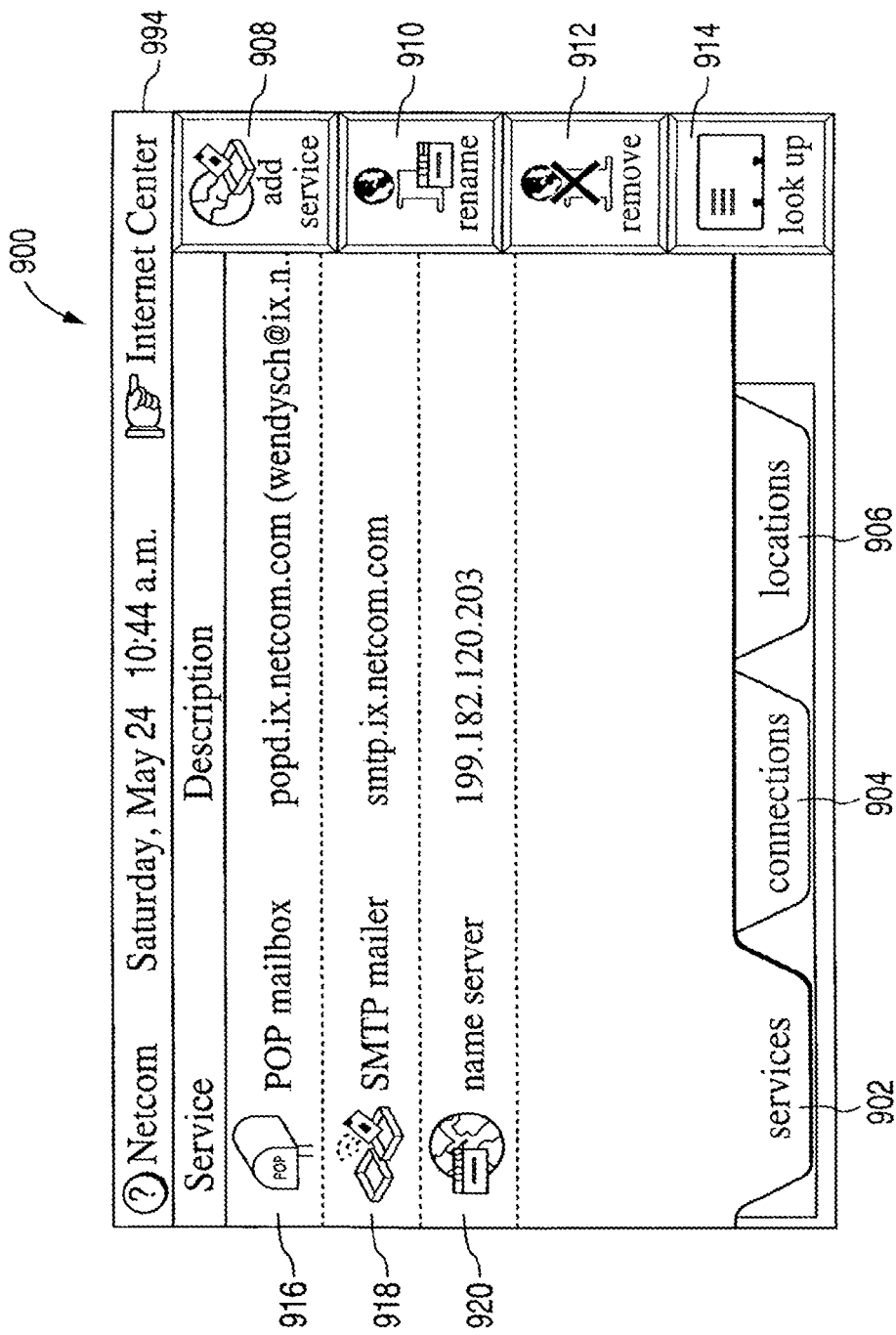
FIGS. 9A-9I are plan views of various network communication scenes and windows for configuring a network service provider in accordance with the present invention.
Figure 9B:
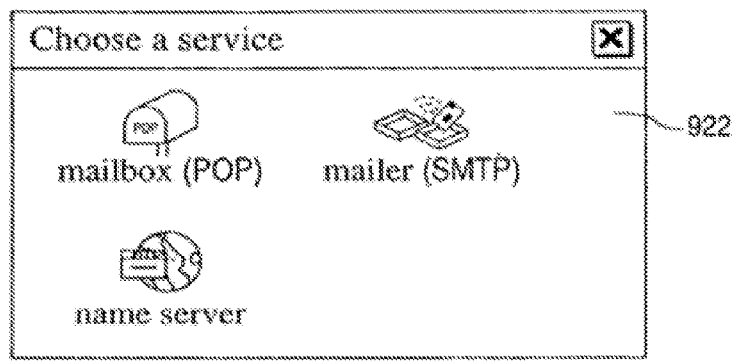
Figure 9C:
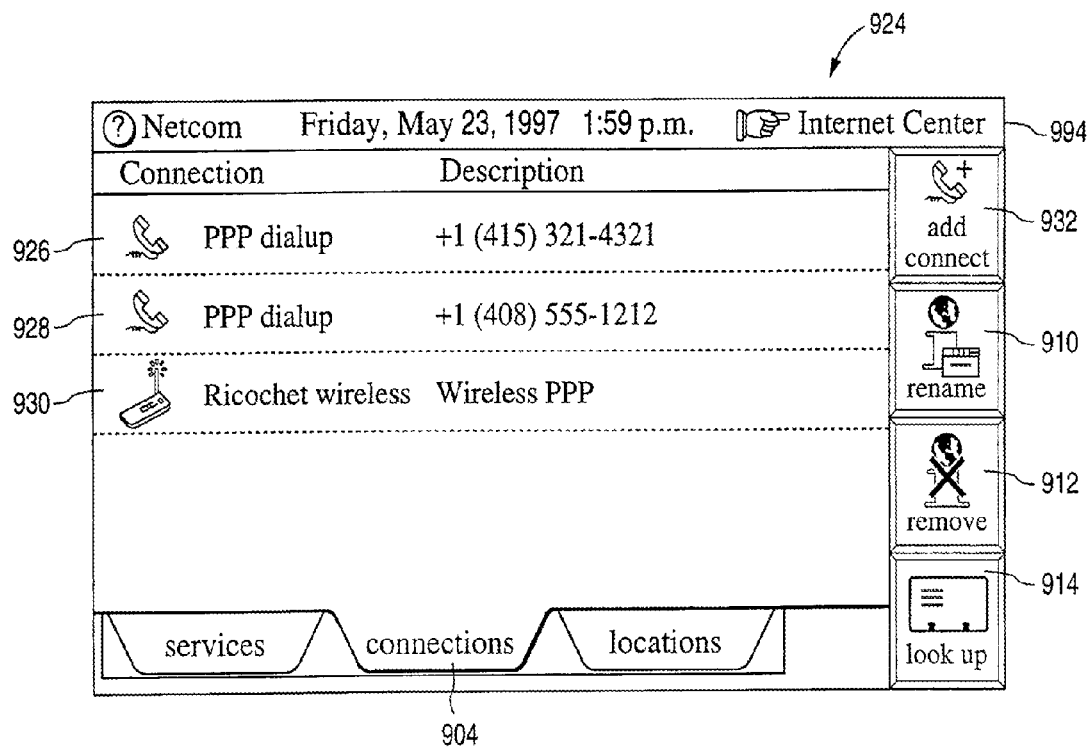
Figure 9D:
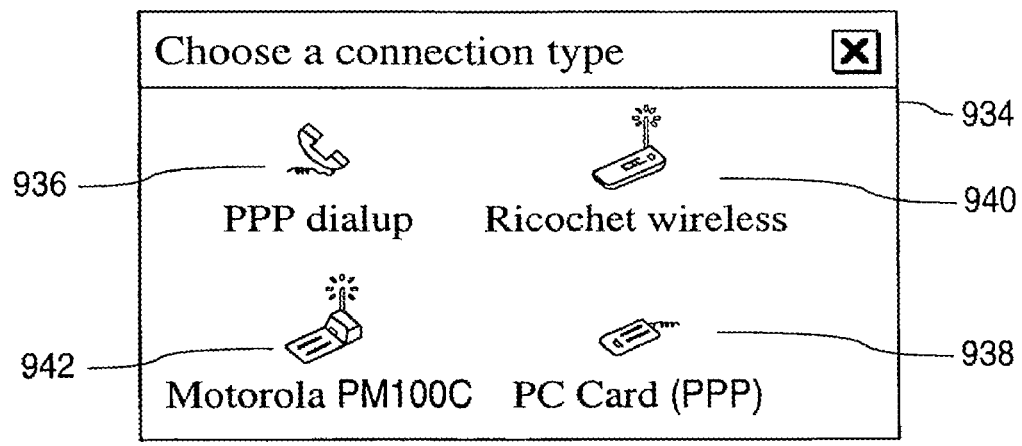

When connections tab 904 in this example of netcom scene 900 is touched, connections scene 924, as shown for example in FIG. 9C, is presented on display device 208. To change the information for any of the dial-up connections listed, as represented by objects such as PPP dial-up object 926, PPP dial-up object 928, or Ricochet wireless object 930 in FIG. 9C, a user touches the object and one or more edit windows (not shown) are presented on display device 208 that allow the user to modify connection information such as the country, telephone number, PPP dial-up account name and password, whether the user will be prompted for user name and password, and whether a terminal window opens to allow the user to communicate directly with the dial-up server. When editing PPP dial-up access, ask when connect option 834 as shown in FIG. 8H is presented to allow the user to choose whether he or she will be prompted for account name and password when attempting to establish a connection, as opposed to storing the information in computer system 200.

Many ISPs offer local access telephone numbers for cities nationwide and even globally. The add connect feature is an example of an interface that allows users who want to connect to an ISP when travelling to connect to a local access telephone number for the ISP and avoid paying long distance telephone charges for access time. When a user touches add connect button 932 as shown in FIG. 9C, choose a connection type window 934 is presented to the user on display device 208. The user touches one of the connection types as exemplified in FIG. 9D by PPP dial-up 936, PC card (PPP) 938, Ricochet wireless 940, or Motorola PM100C 942. The user then enters the information for that access number in edit windows (not shown) that are subsequently presented on display device 208. Note that the application programming interface included in the present invention allows other connection types, such as Ethernet or cellular digital packet data (CDPD), as known in the art, to be added by other application programs.

Figure 9E:
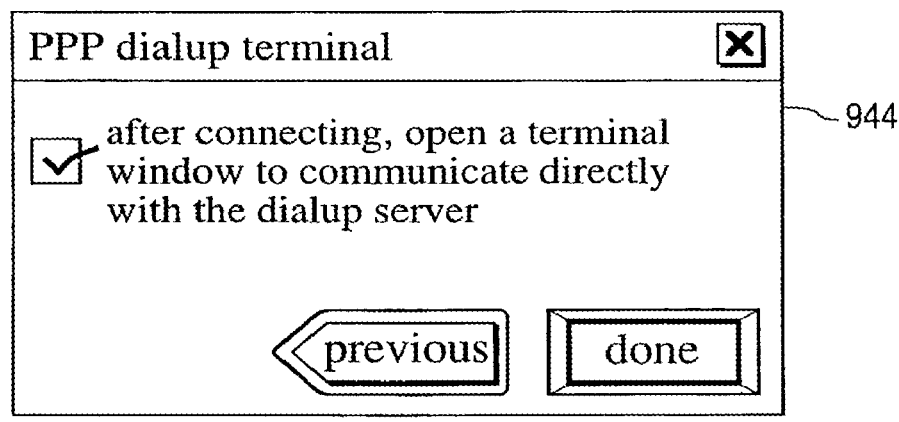

The present invention may also provide a dial-up terminal feature that allows a user to utilize a PPP dial-up connection, such as PPP dial-up 936, to communicate directly with the server. This is especially useful when connecting to ISPs that have a unique system for entering information, such username and password, that the user's computer system 200 does not interface with. Once a PPP dial-up connection is established, an interface, as shown in FIG. 9E, for opening a terminal window (not shown) is presented on display device 208. The user may then enter and receive information as though connected directly to the ISP's server to establish a connection with the server, and then return to his or her own system 200.

Figure 9F:
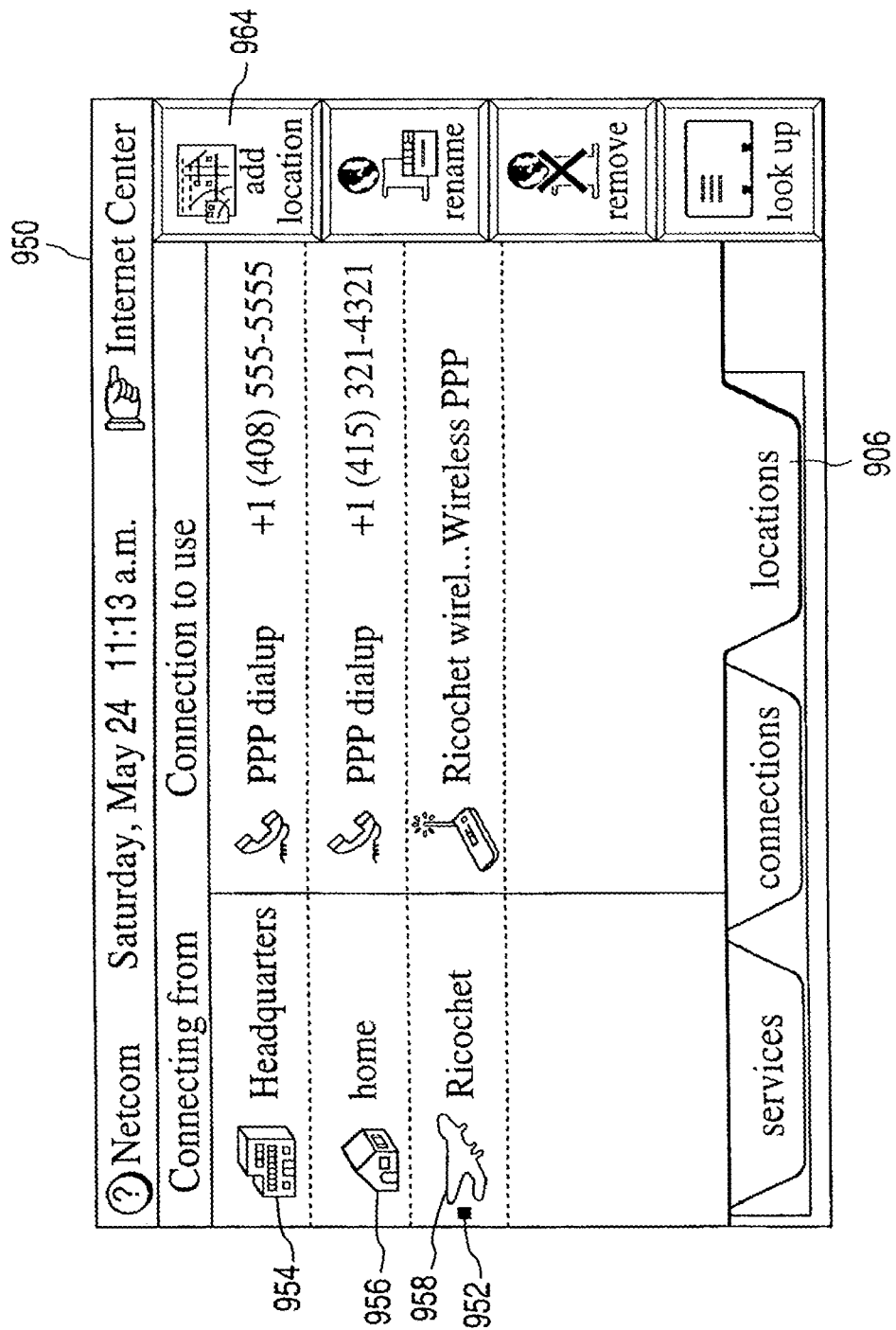
Figure 9G:
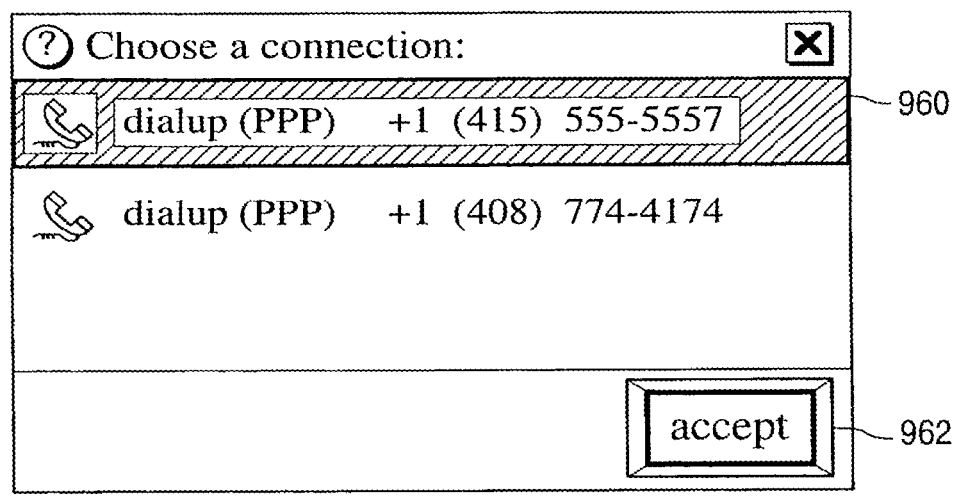

Touching locations tab 906, shown in FIGS. 9A and 9F causes connecting to/from scene 950 to be presented on display device 208. Connecting to/from scene 950 includes information on each connection type and corresponding information, such as the dial-up telephone number, that has been added to the configuration information for the selected ISP. An indicator such as bullet 952 is displayed to indicate the connection currently selected. Connecting to/from scene 950 includes information on the location where the connection is typically made, such as headquarters 954, home 956, or Ricochet 958 (where Ricochet 958 indicates a wireless connection). To reassign a dial-up telephone number to a dialing location, the user touches a location, for instance, headquarters 954, home 956, or Ricochet 958. This causes choose a connection window 960, such as shown in FIG. 9G, to be presented on display device 208. The user touches the desired telephone number from among the choices and then touches accept button 962 to reassign the telephone number and return to connecting to/from scene 950.

Figure 9H:
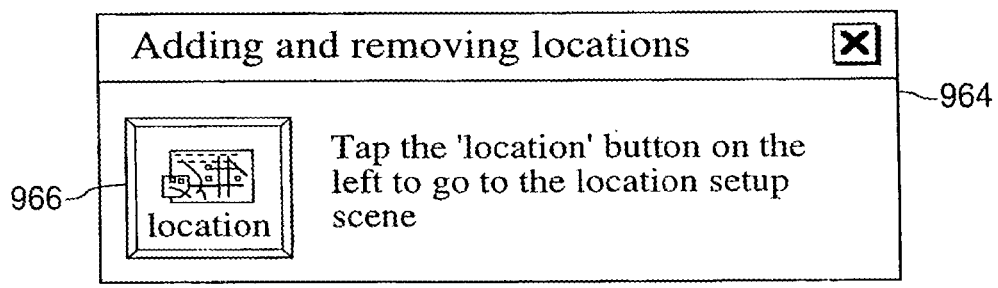
Figure 9I:
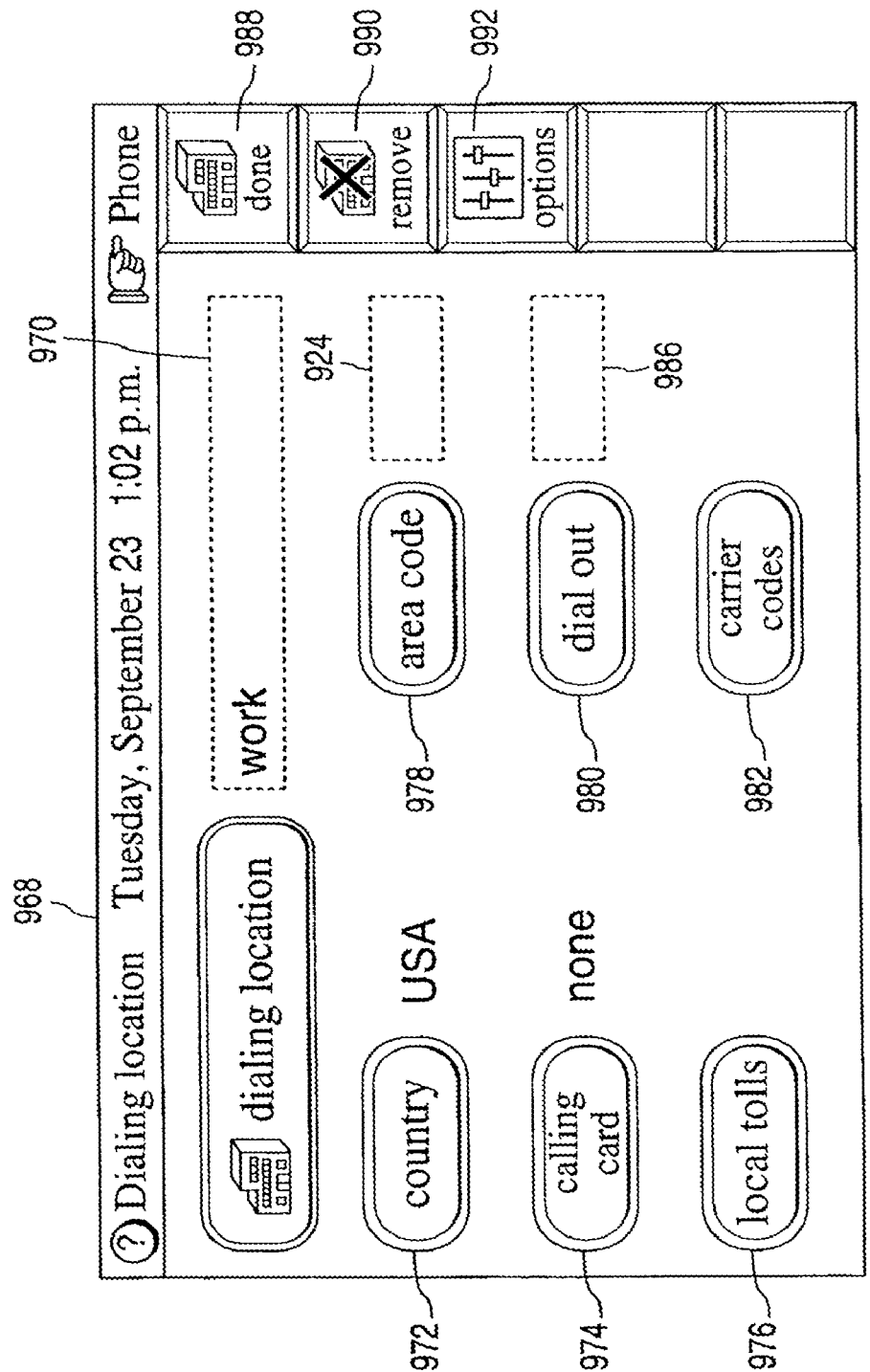

A user may add or remove a location by touching add location button 964, as shown in FIG. 9F. This causes adding and removing locations window 964, as shown in FIG. 9H, to be presented on display device 208. The user touches location button 966 to access location scene 968, shown in FIG. 9I. A description of the location is entered in location edit window 970. This may be done in one of several ways including typing a name in location edit window 970 or using stamper button 438 to select from a catalog of location stamps, (e.g., home, work, hotel, airplane) that are presented in a window on display device 208 when stamper button 438 is activated. Location stamps (not shown) may be dragged or dropped in location edit window 970 to enter the description of the location.

Location scene 968 also includes mechanisms for entering information regarding the location such as country button 972, calling card button 974, local tolls button 976, area code button 978, dial out button 980, and carrier codes button 982. Touching one of buttons 972 through 982 causes a window (not shown) to appear that contains a list of possible selections and allows the user to add, remove, or modify the selections. When finished, the user removes the window from the display through a known mechanism such as touching a "done" button or an X in the upper right hand corner of the window. The current selection appears next to the corresponding button. The user may also edit the current selections using edit windows, such as edit windows 970, 984, and 986.

Location scene 968 also includes done button 988 for exiting location scene 968, remove button 990 for removing the current selection, and options button 992 for setting dial tone options such as volume. When done button 988 is touched, location scene 968 is replaced by connecting to/from scene 950 (FIG. 9F).

When the user is finished entering configuration information thr a new ISP, he or she may return to Internet center 700 by touching the words "Internet center" on navigation bar 994 in netcom scene 900 (FIG. 9A).

The present invention may also allow third-party developers and licensees to install one or more packages that include a self-contained user interface. The packages may provide any number or type of desired features and functions. The packages may be related to a particular ISP, or they may be more general and provide additional functions and features that are available regardless of the ISPs configured in the system. Feature and functions provided by a third-party may be accessible by touching the corresponding ISP on Internet provider sign 702 when the package is related to a particular ISP. Alternatively, a package may contribute one or more additional objects to Internet center scene 700 to provide a mechanism to access the functions and features of the package. For example, a package may install a door (not shown) or a sign such as mail rules sign 708 in Internet center scene 700. Touching the door provides access to a scene generated by the third party package. The third party package may combine its own unique interface as well as borrow interface elements from system software 224. Examples of third-party packages that may be provided include packages that automatically provide or update configuration information, connection types, and services available from an ISP, as well as alternate interactive interfaces that allow the user to view, enter, and modify information, and access other application programs that would otherwise not be accessible via system software 224.

While the invention has been described with respect to the embodiments and variations set forth above, these embodiments and variations are illustrative and the invention is not to be considered limited in scope to these embodiments and variations. For example, to delete an ISP from Internet providers sign 702, a user may touch the name of a particular ISP and drag it to trash truck 448. Each ISP has its own unique configuration information and its own mapping of locations to connections. An important feature of the present invention is that it allows user to configure several ISPs on one computer so that a user may access the Internet or any other communication network from several different geographical locations using a whatever connection types are available for the ISP. It also provides a single, common mechanism for a user to set up all network and network-oriented application services, and to set-up, modify, and delete configuration information using a consistent, common user interface. The user may configure the same ISP for different locations (requiring different local numbers). Two or more ISPs may be configured for the same or different location. Internet center 608 provides a mechanism to easily switch between locations and ISPs. Further, the present invention may accommodate various known communication mediums including telephone, microwave, satellite, and fiber optic devices, and may be implemented on a variety of computer systems 200 or distributed as a program product that a user may install on their own computer system. Additionally, the information and user interfaces presented in various windows on display device 208 may be organized differently and function differently than shown on the accompanying figures. The arrangement of objects and sequence of edit windows shown in FIGS. 4 through 9I herein are for illustration and are not meant to limit the embodiment of the present invention to a particular arrangement or sequence. It is anticipated that the functions of the present invention may be represented in many different ways on a display. Accordingly, various other embodiments and modifications and improvements not described herein may be within the spirit and scope of the present invention, as defined by the following claims.

What is claimed:

1. A computer system having telephonic functionality for communicating with at least one network service provider, the computer system comprising:
   a display;
   a processor;
   a memory having a set of program instructions stored therein and executable by the processor, the program instructions for configuring at least one network service provider, wherein the program instructions when executed by the processor cause the processor to:
      display a network communication scene interface that provides edit windows and selectable options for a user to view, enter, remove, and modify configuration information for the at least one network service provider;
      detect receipt for at least two options for establishing communication with the at least one network service provider; and
      store the configuration information in the memory.

2. The computer system, as set forth in claim 1, wherein the program instructions are further operable to display network services configured for the at least one network service provider in the network communication scene interface.

3. The computer system, as set forth in claim 2, wherein the program instructions when executed by the processor cause the processor to display objects representing services available from the at least one network service provider and to display the network communication scene interface with services selected by the user.

4. The computer system, as set forth in claim 1, wherein the program instructions when executed by the processor cause the processor to display connections configured for the at least one network service provider in the network communication scene interface.

5. The computer system, as set forth in claim 1, wherein the program instructions when executed by the processor cause the processor to display objects representing communication connection types available to establish communication with the at least one network service provider and to display the network communication scene interface with connection types selected by the user.

6. The computer system, as set forth in claim 5, wherein the program instructions when executed by the processor cause the processor to display options for establishing a communication connection with the at least one network service provider, the options being associated with one of the connection types.

7. The computer system, as set forth in claim 1, wherein the program instructions when executed by the processor cause the processor to display locations configured for the at least one network service provider in the network communication scene interface.

8. The computer system, as set forth in claim 7, wherein the program instructions when executed by the processor cause the processor to display location edit windows and selectable options for viewing, entering, and editing connection information for a location.

9. The computer system, as set forth in claim 1, wherein the memory further stores an application programming interface and a second set of program instructions that are executable by the processor, and wherein the second set of program instructions, when executed by the processor, cause the processor to interface with the program instructions for configuring the at least one network service provider using the application programming interface.

10. The computer system, as set forth in claim 9, wherein the second set of program instructions able read and write access to the configuration information.

11. The computer system, as set forth in claim 9, wherein the second set of program instructions present a customized user interface for viewing, entering, and editing the configuration information.

12. A method for configuring information for a network service provider, comprising:
    using one or more processors to perform steps comprising:
       generating a network communication scene interface for displaying on a display device, the network communication scene interface providing edit windows and selectable options for a user to view, enter, remove, and modify configuration information for the network service provider, wherein the user is enabled to enter at least two different means for establishing communication with the network service provider via a user input device; and
       storing the configuration information in a data storage device.

13. The method, as set forth in claim 12, wherein the steps further comprise:
    displaying services configured for the network service provider in the network communication scene interface.

14. The method, as set forth in claim 13, wherein the network communication scene interface includes an add service button, the steps further comprise:
    displaying a choose service window, the choose service window including objects representing services available from the network service provider; and
    displaying the network communication scene interface with the added service.

15. The method, as set forth in claim 12, wherein the network communication scene interface includes a rename button.

16. The method, as set forth in claim 12, wherein the network communication scene interface includes a remove button.

17. The method, as set forth in claim 12, wherein the network communication scene interface includes a look up button.

18. The method, as set forth in claim 12, wherein the steps further comprise:
    displaying connections configured for the network service provider in the network communication scene interface.

19. The method, as set forth in claim 18, wherein the steps further comprise:
   displaying a choose connection type window, the choose connection type window including objects representing communication connections available to establish communication with the network service provider;
   receiving a user selection of a connection type from the choose connection type window via the user input device; and
   displaying the network communication scene interface with the selected connection type.

20. The method, as set forth in claim 12, wherein the steps further comprise:
   displaying a choose connection window, the choose connection window including options for establishing a communication connection with the network service provider, the options being associated with the connection type.

* * * * *